(12) United States Patent
Meder et al.

(10) Patent No.: US 7,305,983 B1
(45) Date of Patent: Dec. 11, 2007

(54) ASSESSMENT OF SOLAR ENERGY POTENTIAL ON EXISTING BUILDINGS IN A REGION

(75) Inventors: Stephen E. Meder, Kailua, HI (US); Olivier A. Pennetier, Honolulu, HI (US); David M. Ansberry, Honolulu, HI (US); I Meco Indriaja Marcus Brunner, Honolulu, HI (US)

(73) Assignee: University of Hawai'i, Honolulu, HI (US)

( * ) Notice: Subject to any disclaimer, the term of this patent is extended or adjusted under 35 U.S.C. 154(b) by 96 days.

(21) Appl. No.: 10/884,804

(22) Filed: Jul. 2, 2004

Related U.S. Application Data

(60) Provisional application No. 60/485,967, filed on Jul. 8, 2003.

(51) Int. Cl.
*F24J 2/00* (2006.01)
*G01C 1/00* (2006.01)

(52) U.S. Cl. .................. 126/621; 73/170.27; 33/1 DD
(58) Field of Classification Search ................ 126/714, 126/621, 623; 136/243, 244, 290, 292; 73/170.27, 73/170.16; 33/1 DD
See application file for complete search history.

(56) References Cited

U.S. PATENT DOCUMENTS

| 3,390,576 | A | * | 7/1968 | Yellott ...................... 73/170.27 |
| 4,111,360 | A | * | 9/1978 | Barr ........................... 126/628 |
| 4,177,566 | A | * | 12/1979 | Haines ........................ 33/1 DD |
| 4,236,313 | A | * | 12/1980 | Griffin, Jr. .................. 33/1 DD |
| 4,435,640 | A | * | 3/1984 | Micheletto ................ 235/78 M |

FOREIGN PATENT DOCUMENTS

DE            3119323 A1 * 12/1982

OTHER PUBLICATIONS

Harrel, Joe J., Jr. Solar Heating and Cooling of Buildings. New York: Van Nostrand Reinhold, 1982.*
Pielke Sr., R. A., G. E. Liston, W. L. Chapman, D. A. Robinson. "Actual and insolation-weighted Northern Hemisphere snow cover and sea-ice between 1973-2002." Climate Dynamics 22: 591-595 (2004).*

* cited by examiner

*Primary Examiner*—Josiah C. Cocks
(74) *Attorney, Agent, or Firm*—Leighton K. Chong, IP & Patent Atty

(57) ABSTRACT

A method for assessing solar insolation potential upon existing building rooftops in a given region comprises: (a) computing Global Horizontal Insolation values based on topographical Digital Elevation Model (DEM) data for the region; computing a Sky Transmissivity parameter as it affects Global Horizontal Insolation based on available climate and cloud cover data for the region; (c) applying an Albedo parameter for ground reflectivity and scattering to determine Diffuse Insolation values; (d) applying a Shading Coefficient based on measuring shadow surface areas in relation to total area from aerial photographs of the region over defined times and periods; (e) determining Total Building Roof Area based on image analysis of aerial photographs of the region, and applying a typical roof slope factor; (f) estimating typical Roof Slope, Type, and Orientation (azimuth) selected from a defined set (vocabulary) of rooftop types based on a visual survey of the region; and (g) calculating Total Building Rooftop Insolation Potential for the given region based the values determined.

3 Claims, 27 Drawing Sheets

Figure 1 – Total Solar Insolation Potential Assessment Method

- Acquisition of aerial photographs of the area of study.

- Acquisition of GIS layers and Digital Elevation Models (DEM).

- Scaling and georeferencing of the aerial photographs to GIS layers.

- Identification and sizing of rooftop areas within the area of study.

- Identification of rooftop orientation within GIS platform.

- Field survey to identify and verify rooftop areas, typologies and slope angles (pitch).

- Adjustment of rooftop areas from slope angle.

- Identification of horizontal global insolation within area of study.

- Assessment of insolation on existing building rooftops.

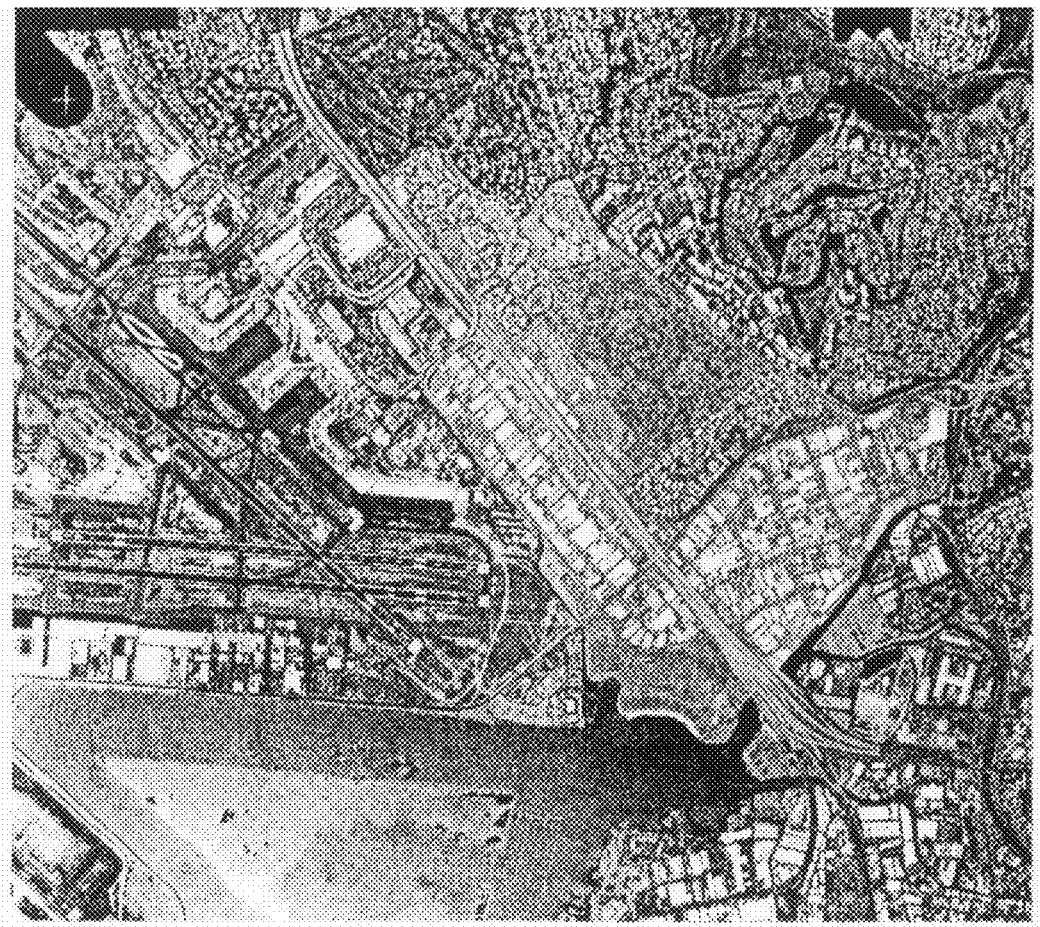
FIG. 2.1 Aerial Photo of Mapunapuna Region

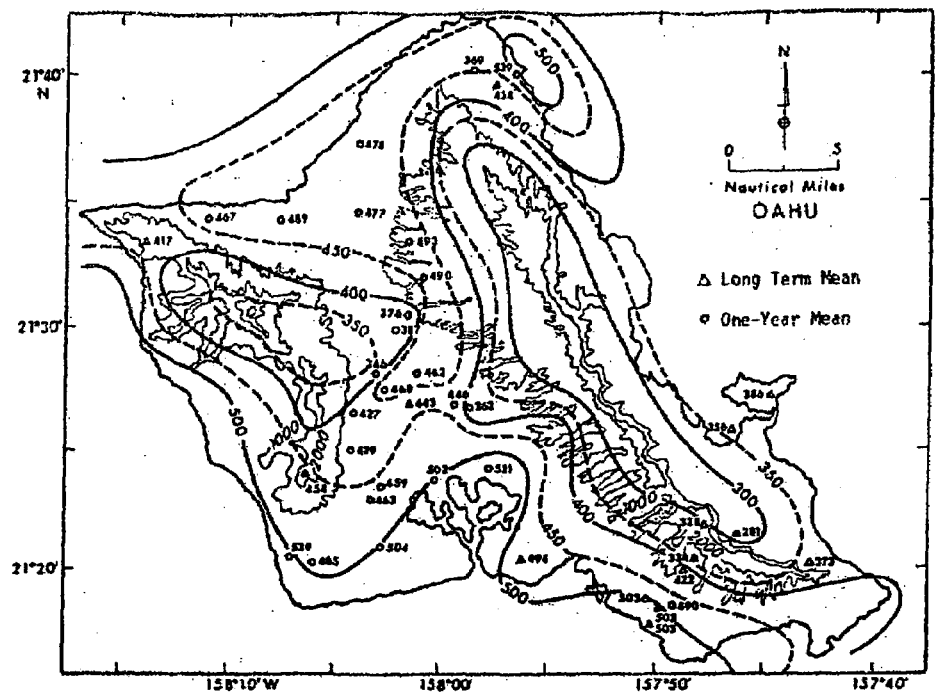
FIG. 2.2    Isoclines of Mean Annual Insolation
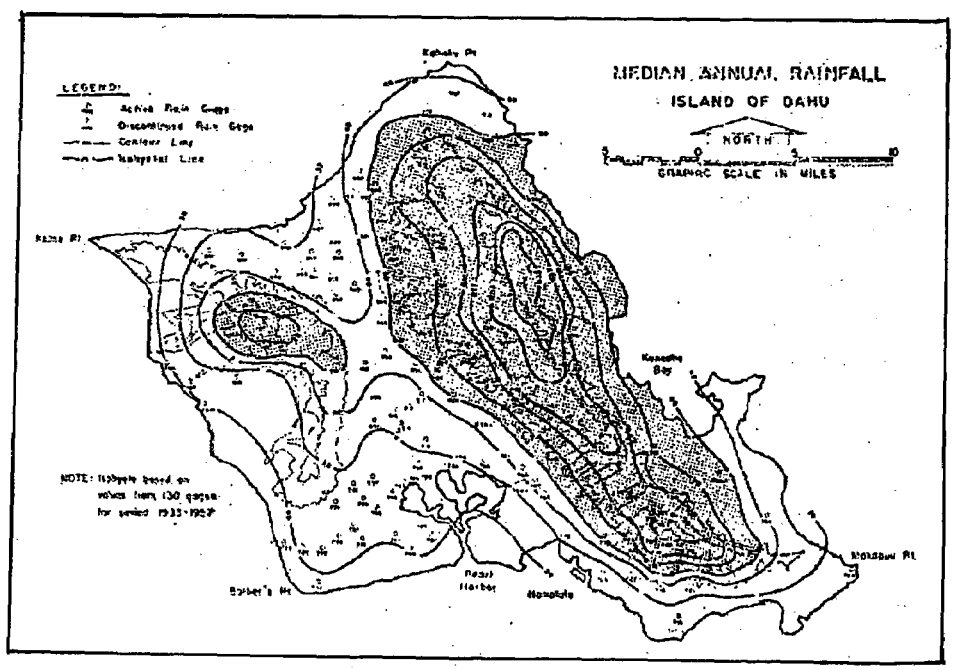
FIG. 2.3    Median Annual Rainfall on Island of Oahu

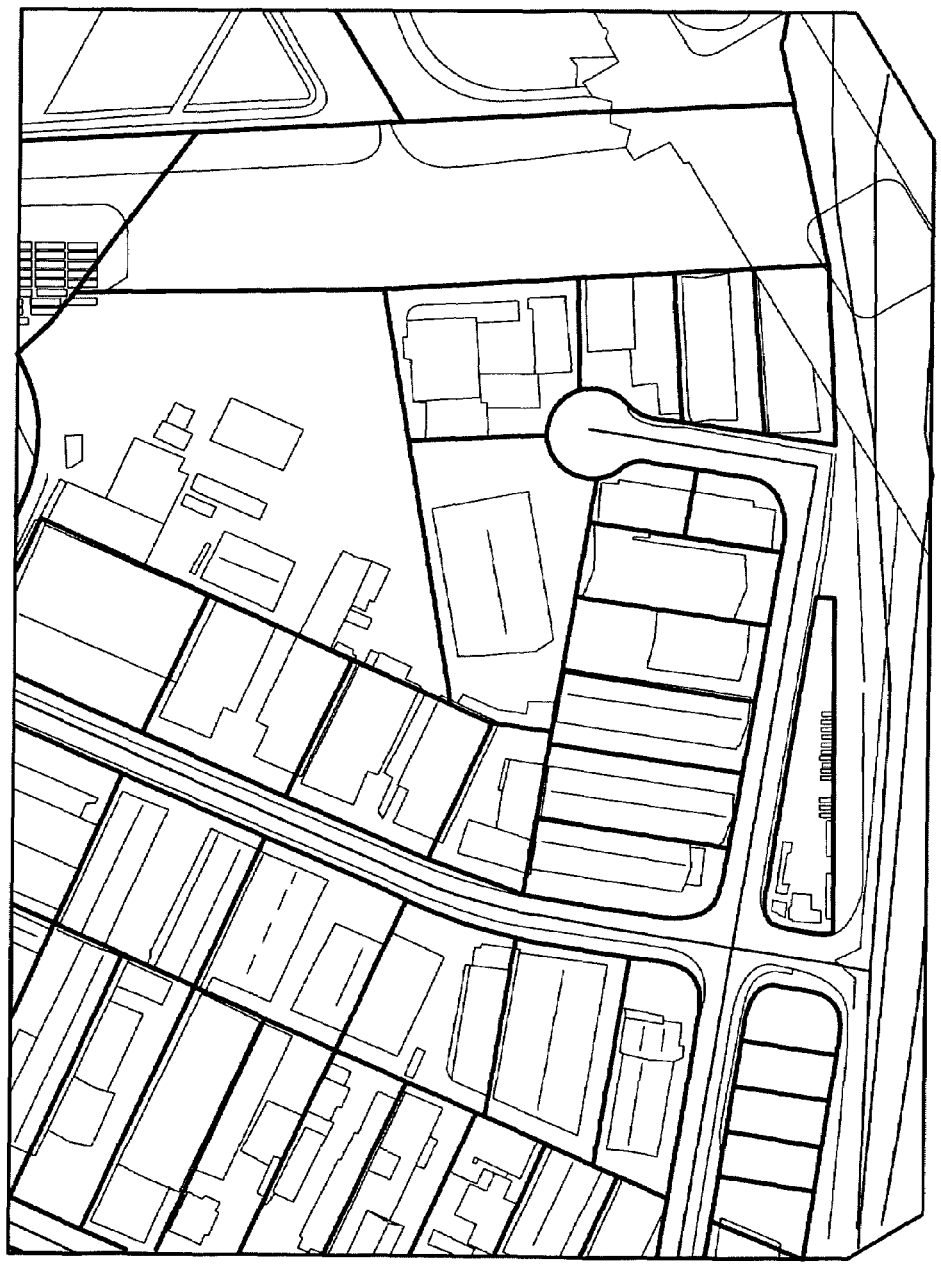
FIG. 3.1
Sample of a Scaled and Georeferenced Aerial Photograph Overlaid onto a GIS Map

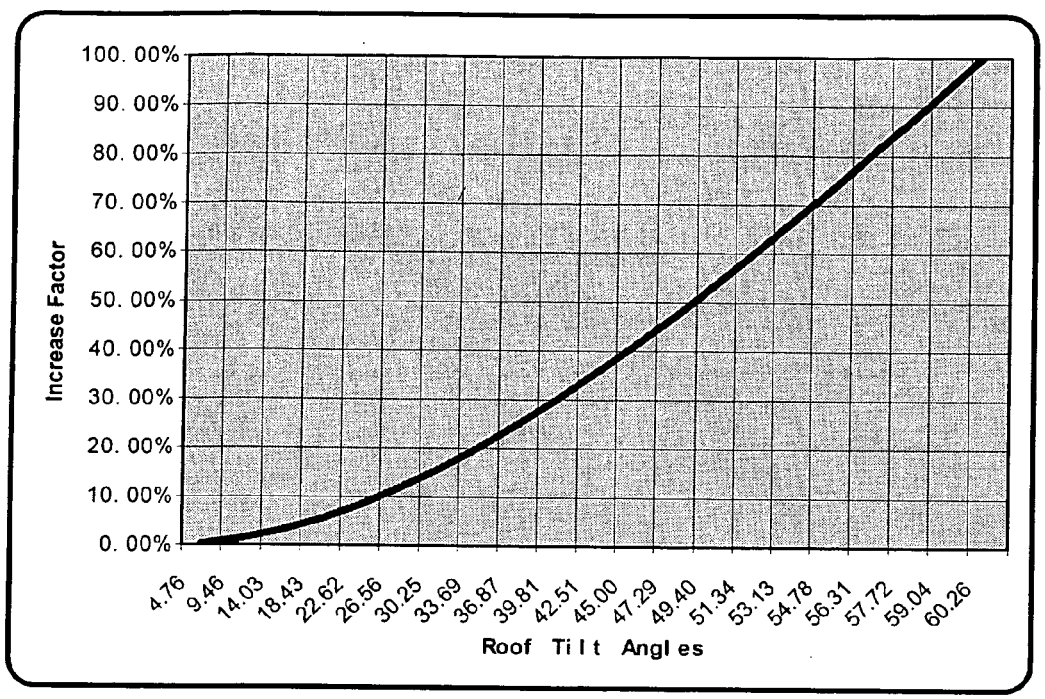
FIG. 3.2    Area Increase Factor v Roof Tilt Angle

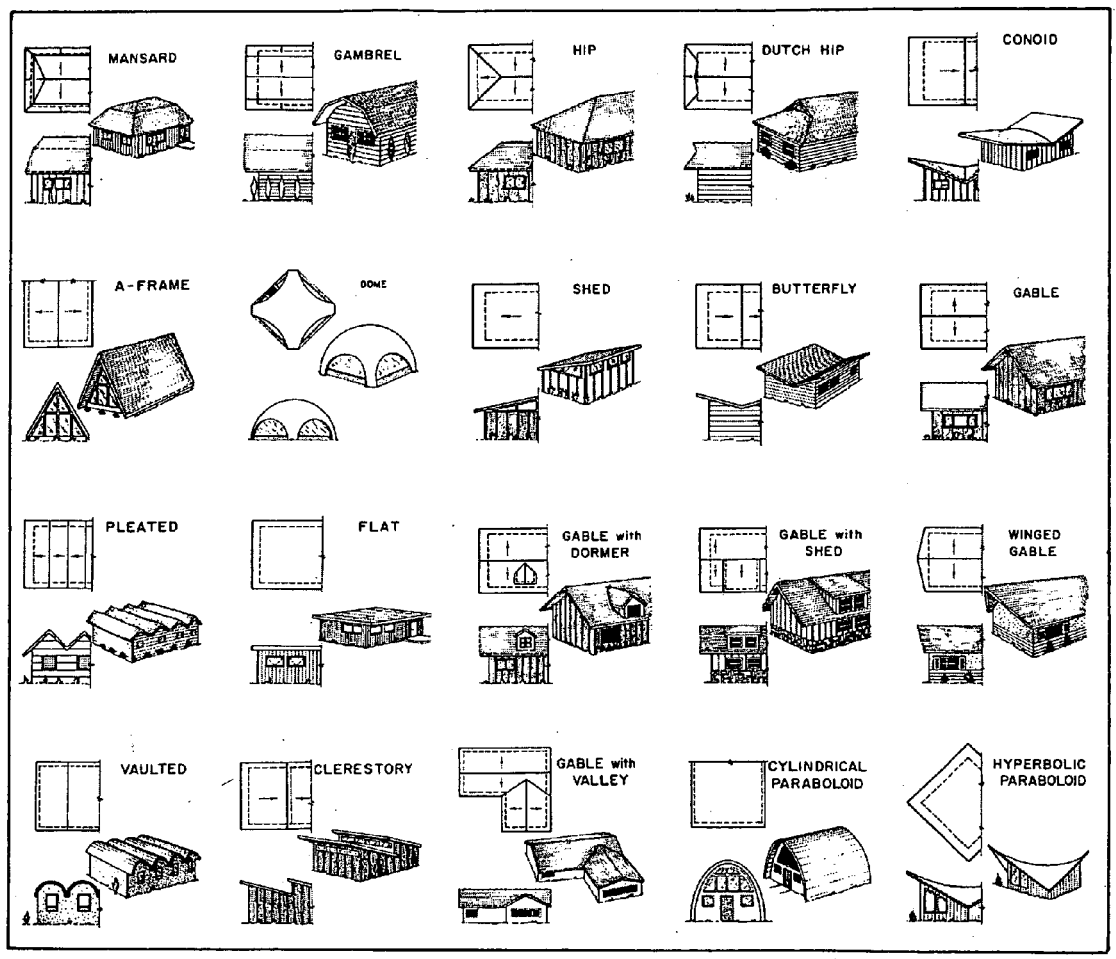
FIG. 3.3    Samples of Architectural Roof Typology

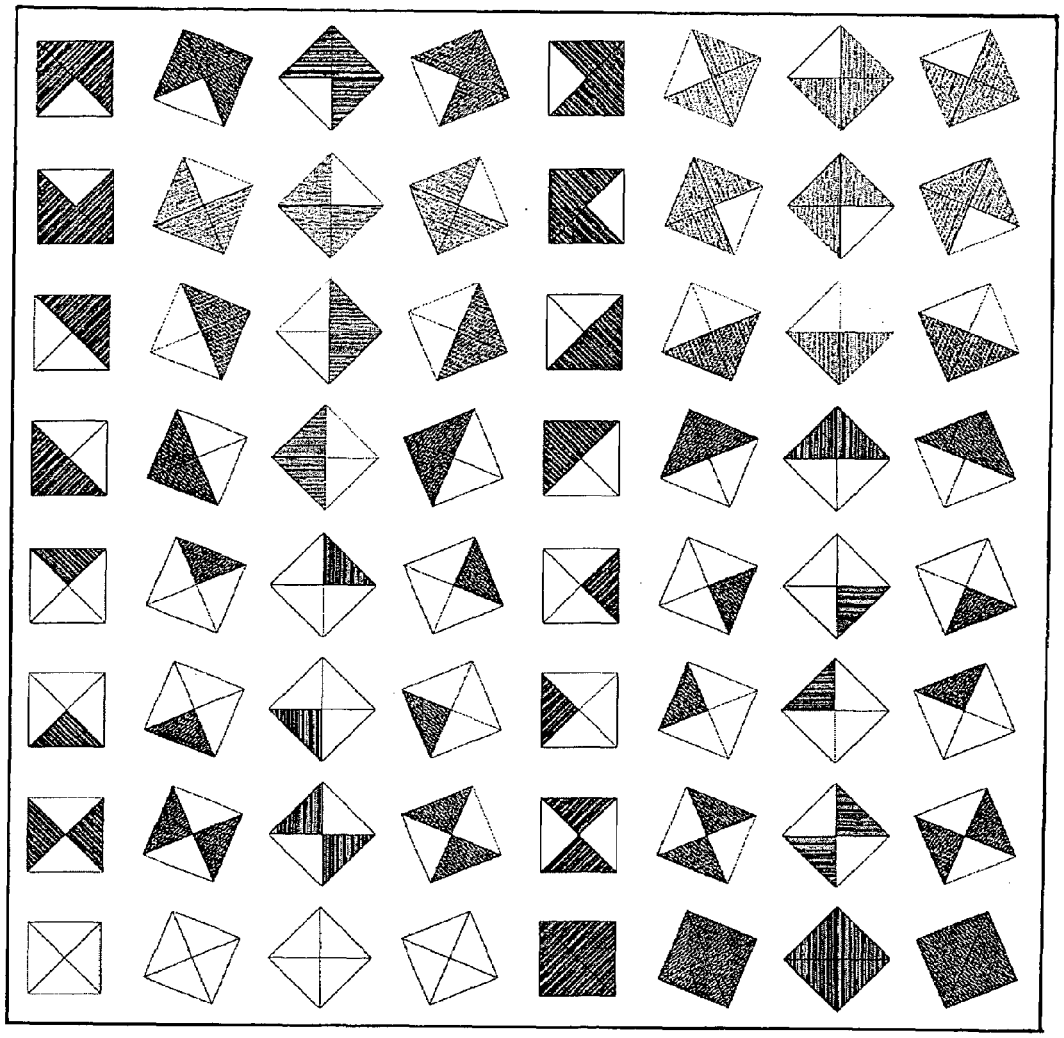
FIG. 3.4    Proposed Systematic Rooftop Vocabulary

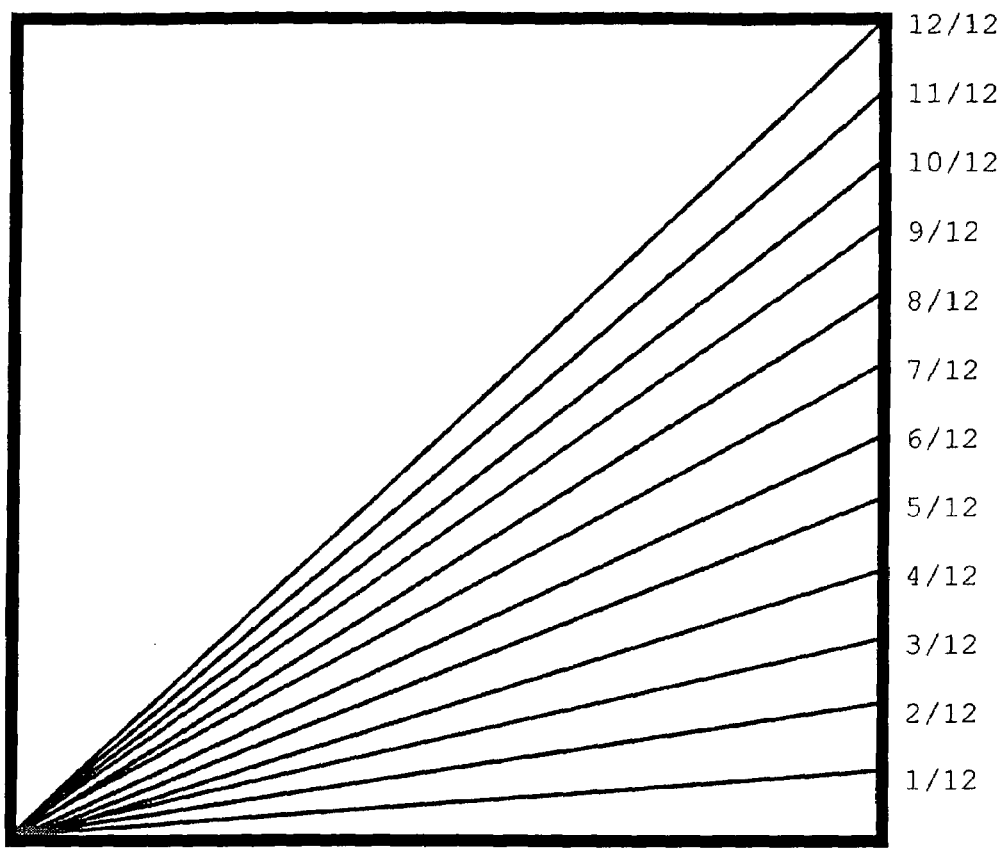
FIG. 3.5  Roof Pitches

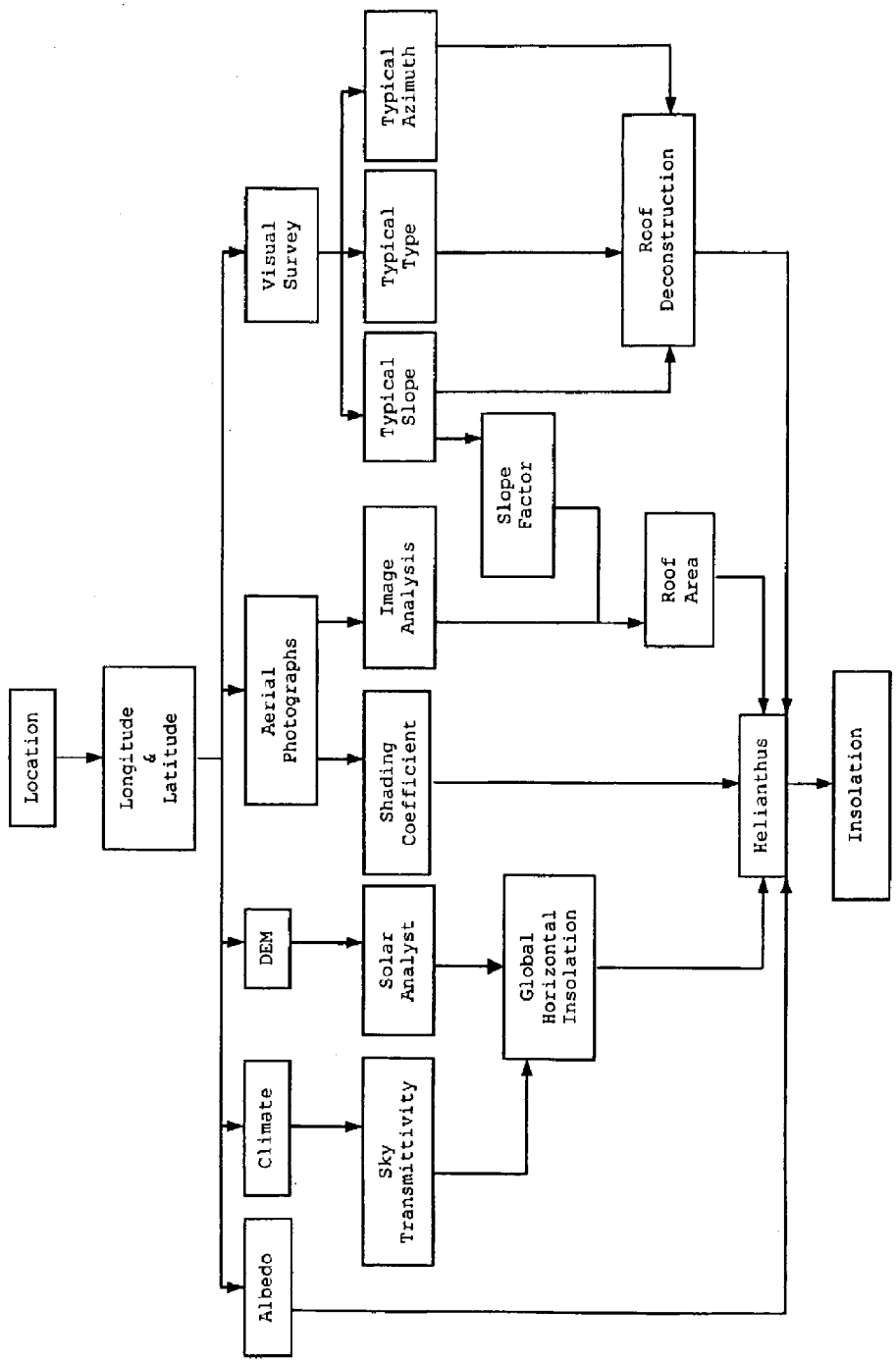
FIG. 3.6   Total Building Rooftop Insolation Potential Calculation

Table 3.6 - Example of an Insolation versus Surface Tilt Azimuth Angles Matrix within Helianthus

| Yearly Latitude = 21.33 | Efficiency Comparison from Optimum Yearly Average | Total Insolation on Tilted Surface |
|---|---|---|

Yearly Average Total

| | | Surface Azimuth Angle y | | | | | | | | | | | | | | | |
|---|---|---|---|---|---|---|---|---|---|---|---|---|---|---|---|---|---|
| | | N | NNE | NE | ENE | E | ESE | SE | SSE | S | SSW | SW | WSW | W | WNW | NW | NNW | N |
| #REFI | | -180.0 | -157.5 | -135.0 | -112.5 | -90.0 | -67.5 | -45.0 | -22.5 | 0.0 | 22.5 | 45.0 | 67.5 | 90 | 112.5 | 135 | 157.5 | 180.0 |
| SURFACE TILT ANGLE β | 0 | 1909.77 | 1909.77 | 1909.77 | 1909.77 | 1909.77 | 1909.77 | 1909.77 | 1909.77 | 1909.77 | 1909.77 | 1909.77 | 1909.77 | 1909.77 | 1909.77 | 1909.77 | 1909.77 | 1909.77 |
| | 5 | 1862.31 | 1865.72 | 1875.29 | 1889.42 | 1905.84 | 1922.03 | 1935.61 | 1944.64 | 1947.83 | 1944.64 | 1935.61 | 1922.03 | 1905.84 | 1889.42 | 1875.29 | 1865.72 | 1862.31 |
| | 10 | 1805.81 | 1812.96 | 1832.73 | 1861.48 | 1894.30 | 1926.11 | 1952.49 | 1969.95 | 1976.17 | 1969.95 | 1952.49 | 1926.11 | 1894.30 | 1861.48 | 1832.73 | 1812.96 | 1805.81 |
| | 15 | 1740.72 | 1751.99 | 1782.72 | 1826.58 | 1875.56 | 1922.15 | 1960.31 | 1985.52 | 1994.60 | 1985.52 | 1960.31 | 1922.15 | 1875.56 | 1826.58 | 1782.72 | 1751.99 | 1740.72 |
| | 20 | 1667.52 | 1683.43 | 1726.02 | 1785.39 | 1850.07 | 1910.33 | 1959.08 | 1991.23 | 2002.95 | 1991.23 | 1959.08 | 1910.33 | 1850.07 | 1785.39 | 1726.02 | 1683.43 | 1667.52 |
| | 25 | 1586.79 | 1607.98 | 1663.49 | 1738.67 | 1818.30 | 1890.88 | 1948.83 | 1987.04 | 2001.18 | 1987.04 | 1948.83 | 1890.88 | 1818.30 | 1738.67 | 1663.49 | 1607.98 | 1586.79 |
| | 30 | 1499.15 | 1526.52 | 1596.15 | 1687.20 | 1780.74 | 1864.08 | 1929.71 | 1972.99 | 1989.29 | 1972.99 | 1929.71 | 1864.08 | 1780.74 | 1687.20 | 1596.15 | 1526.52 | 1499.15 |
| | 35 | 1405.30 | 1440.10 | 1525.15 | 1631.76 | 1737.88 | 1830.24 | 1901.92 | 1949.19 | 1967.38 | 1949.19 | 1901.92 | 1830.24 | 1737.88 | 1631.76 | 1525.15 | 1440.10 | 1405.30 |
| | 40 | 1305.98 | 1350.06 | 1451.75 | 1573.16 | 1690.23 | 1789.76 | 1865.75 | 1915.85 | 1935.62 | 1915.85 | 1865.75 | 1789.76 | 1690.23 | 1573.16 | 1451.75 | 1350.06 | 1305.98 |
| | 45 | 1202.04 | 1258.10 | 1377.28 | 1512.15 | 1638.30 | 1743.06 | 1821.55 | 1873.23 | 1894.23 | 1873.23 | 1821.55 | 1743.06 | 1638.30 | 1512.15 | 1377.28 | 1258.10 | 1202.04 |
| | 50 | 1094.44 | 1166.49 | 1303.09 | 1449.44 | 1582.61 | 1690.62 | 1769.77 | 1821.68 | 1843.55 | 1821.68 | 1769.77 | 1690.62 | 1582.61 | 1449.44 | 1303.09 | 1166.49 | 1094.44 |
| | 55 | 984.46 | 1078.19 | 1230.43 | 1385.70 | 1523.67 | 1632.97 | 1710.94 | 1761.64 | 1783.95 | 1761.64 | 1710.94 | 1632.97 | 1523.67 | 1385.70 | 1230.43 | 1078.19 | 984.46 |
| | 60 | 874.88 | 996.70 | 1160.36 | 1321.49 | 1462.01 | 1570.71 | 1645.65 | 1693.60 | 1715.89 | 1693.60 | 1645.65 | 1570.71 | 1462.01 | 1321.49 | 1160.36 | 996.70 | 874.88 |
| | 65 | 793.39 | 925.21 | 1093.64 | 1257.31 | 1398.16 | 1504.45 | 1574.61 | 1618.15 | 1639.88 | 1618.15 | 1574.61 | 1504.45 | 1398.16 | 1257.31 | 1093.64 | 925.21 | 793.39 |
| | 70 | 770.27 | 848.26 | 1030.71 | 1193.60 | 1332.65 | 1434.86 | 1498.59 | 1535.97 | 1556.51 | 1535.97 | 1498.59 | 1434.86 | 1332.65 | 1193.60 | 1030.71 | 848.26 | 770.27 |
| | 75 | 746.40 | 815.55 | 971.72 | 1130.74 | 1265.99 | 1362.66 | 1418.47 | 1447.81 | 1466.41 | 1447.81 | 1418.47 | 1362.66 | 1265.99 | 1130.74 | 971.72 | 815.55 | 746.40 |
| | 80 | 721.97 | 773.72 | 916.56 | 1068.96 | 1198.73 | 1288.60 | 1335.21 | 1354.56 | 1370.27 | 1354.56 | 1335.21 | 1288.60 | 1198.73 | 1068.96 | 916.56 | 773.72 | 721.97 |
| | 85 | 697.16 | 737.09 | 864.98 | 1008.76 | 1131.39 | 1213.43 | 1249.87 | 1257.24 | 1268.81 | 1257.24 | 1249.87 | 1213.43 | 1131.39 | 1008.76 | 864.98 | 737.09 | 697.16 |
| | 90 | 672.15 | 703.82 | 816.69 | 950.18 | 1064.48 | 1137.95 | 1163.63 | 1157.13 | 1162.81 | 1157.13 | 1163.63 | 1137.95 | 1064.48 | 950.18 | 816.69 | 703.82 | 672.15 |

FIG. 3.7

Table 3.7 - Example of a Potential Insolation versus Surface Tilt Azimuth Angles Matrix within Helianthus

| | Yearly | Latitude = 21.33 | | | Efficiency Comparison from Optimum Yearly Average Total Insolation on Tilted Surface | | | | | | | | | | | | | |
|---|---|---|---|---|---|---|---|---|---|---|---|---|---|---|---|---|---|---|
| 95%-100% | Albedo 0.20 | | | | | | | | Surface Azimuth Angle g | | | | | | | | | |
| 90%-95% | | | | | | | | | | | | | | | | | | |
| 85%-90% | | N | NNE | NE | ENE | E | ESE | SE | SSE | S | SSW | SW | WSW | W | WNW | NW | NNW | N |
| 0%-85% | | -180.0 | -157.5 | -135.0 | -112.5 | -90.0 | -67.5 | -45.0 | -22.5 | 0.0 | 22.5 | 45.0 | 67.5 | 90 | 112.5 | 135 | 157.5 | 180.0 |
| | 0 | 95.3% | 95.3% | 95.3% | 95.3% | 95.3% | 95.3% | 95.3% | 95.3% | 95.3% | 95.3% | 95.3% | 95.3% | 95.3% | 95.3% | 95.3% | 95.3% | 95.3% |
| | 5 | 93.0% | 93.1% | 93.6% | 94.3% | 95.3% | 96.0% | 96.6% | 97.1% | 97.2% | 97.1% | 96.6% | 96.0% | 95.2% | 94.3% | 93.6% | 93.1% | 93.0% |
| | 10 | 90.2% | 90.5% | 91.5% | 92.4% | 94.6% | 96.2% | 97.5% | 98.4% | 98.2% | 98.4% | 97.5% | 96.2% | 94.6% | 92.9% | 91.5% | 90.5% | 90.2% |
| | 15 | 86.9% | 87.5% | 89.0% | 91.2% | 93.6% | 96.0% | 97.9% | 99.1% | 99.6% | 99.1% | 97.9% | 96.0% | 93.6% | 91.2% | 89.0% | 87.5% | 86.9% |
| | 20 | 83.3% | 84.0% | 86.2% | 89.1% | 92.4% | 95.4% | 97.8% | 99.4% | 100.0% | 99.4% | 97.8% | 95.4% | 92.4% | 89.1% | 86.2% | 84.0% | 83.3% |
| | 25 | 79.2% | 80.3% | 83.1% | 86.8% | 90.8% | 94.4% | 97.3% | 99.2% | 99.9% | 99.2% | 97.3% | 94.4% | 90.8% | 86.8% | 83.1% | 80.3% | 79.2% |
| | 30 | 74.8% | 76.2% | 79.7% | 84.2% | 88.9% | 93.1% | 96.3% | 98.5% | 99.3% | 98.5% | 96.3% | 93.1% | 88.9% | 84.2% | 79.7% | 76.2% | 74.8% |
| | 35 | 70.2% | 71.9% | 76.1% | 81.5% | 86.8% | 91.4% | 95.0% | 97.3% | 98.2% | 97.3% | 95.0% | 91.4% | 86.8% | 81.5% | 76.1% | 71.9% | 70.2% |
| | 40 | 65.2% | 67.4% | 72.5% | 78.5% | 84.4% | 89.4% | 93.1% | 95.7% | 96.6% | 95.7% | 93.1% | 89.4% | 84.4% | 78.5% | 72.5% | 67.4% | 65.2% |
| | 45 | 60.0% | 62.8% | 68.8% | 75.5% | 81.8% | 87.0% | 90.9% | 93.5% | 94.6% | 93.5% | 90.9% | 87.0% | 81.8% | 75.5% | 68.8% | 62.8% | 60.0% |
| SURFACE | 50 | 54.6% | 58.2% | 65.1% | 72.4% | 79.0% | 84.4% | 88.4% | 90.9% | 92.0% | 90.9% | 88.4% | 84.4% | 79.0% | 72.4% | 65.1% | 58.2% | 54.6% |
| TILT | 55 | 49.2% | 53.8% | 61.4% | 69.2% | 76.1% | 81.5% | 85.4% | 88.0% | 89.1% | 88.0% | 85.4% | 81.5% | 76.1% | 69.2% | 61.4% | 53.8% | 49.2% |
| ANGLE | 60 | 43.7% | 49.8% | 57.9% | 66.0% | 73.0% | 78.4% | 82.2% | 84.6% | 85.7% | 84.6% | 82.2% | 78.4% | 73.0% | 66.0% | 57.9% | 49.8% | 43.7% |
| β | 65 | 39.6% | 46.2% | 54.6% | 62.8% | 69.8% | 75.1% | 78.6% | 80.8% | 81.9% | 80.8% | 78.6% | 75.1% | 69.8% | 62.8% | 54.6% | 46.2% | 39.6% |
| | 70 | 38.5% | 42.4% | 51.5% | 59.6% | 66.5% | 71.6% | 74.8% | 76.7% | 77.7% | 76.7% | 74.8% | 71.6% | 66.5% | 59.6% | 51.5% | 42.4% | 38.5% |
| | 75 | 37.3% | 40.7% | 48.5% | 56.5% | 63.2% | 68.0% | 70.8% | 72.3% | 73.2% | 72.3% | 70.8% | 68.0% | 63.2% | 56.5% | 48.5% | 40.7% | 37.3% |
| | 80 | 36.0% | 38.6% | 45.8% | 53.4% | 59.8% | 64.3% | 66.7% | 67.6% | 68.4% | 67.6% | 66.7% | 64.3% | 59.8% | 53.4% | 45.8% | 38.6% | 36.0% |
| | 85 | 34.8% | 36.8% | 43.2% | 50.4% | 56.5% | 60.6% | 62.4% | 62.8% | 63.3% | 62.8% | 62.4% | 60.6% | 56.5% | 50.4% | 43.2% | 36.8% | 34.8% |
| | 90 | 33.6% | 35.1% | 40.8% | 47.4% | 53.1% | 56.8% | 58.1% | 57.8% | 58.1% | 57.8% | 58.1% | 56.8% | 53.1% | 47.4% | 40.8% | 35.1% | 33.6% |

FIG. 3.8

Table 3.13 - Computed Error Deviation Values Between Insolation Calculated with an Albedo of 0% and Insolation Values Calculated with and Albedo of 10%

| DELTA | N | NNE | NE | ENE | E | ESE | SE | SSE | S | SSW | SW | WSW | W | WNW | NW | NNW | N |
|---|---|---|---|---|---|---|---|---|---|---|---|---|---|---|---|---|---|
| 0.1/0.0 | -180.0 | -157.5 | -135 | -112.5 | -90.0 | -67.5 | -45.0 | -22.5 | 0.0 | 22.5 | 45.0 | 67.5 | 90 | 112.5 | 135 | 157.5 | 180.0 |
| 0 | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| 5 | 0.02% | 0.02% | 0.02% | 0.02% | 0.02% | 0.02% | 0.02% | 0.02% | 0.02% | 0.02% | 0.02% | 0.02% | 0.02% | 0.02% | 0.02% | 0.02% | 0.02% |
| 10 | 0.08% | 0.08% | 0.08% | 0.08% | 0.08% | 0.08% | 0.07% | 0.07% | 0.07% | 0.07% | 0.07% | 0.08% | 0.08% | 0.08% | 0.08% | 0.08% | 0.08% |
| 15 | 0.19% | 0.19% | 0.19% | 0.18% | 0.18% | 0.17% | 0.17% | 0.17% | 0.16% | 0.17% | 0.17% | 0.17% | 0.18% | 0.18% | 0.19% | 0.19% | 0.19% |
| 20 | 0.35% | 0.35% | 0.34% | 0.33% | 0.32% | 0.31% | 0.30% | 0.29% | 0.29% | 0.29% | 0.30% | 0.31% | 0.32% | 0.33% | 0.34% | 0.35% | 0.35% |
| 25 | 0.58% | 0.57% | 0.55% | 0.53% | 0.50% | 0.48% | 0.47% | 0.46% | 0.45% | 0.46% | 0.47% | 0.48% | 0.50% | 0.53% | 0.55% | 0.57% | 0.58% |
| 30 | 0.88% | 0.87% | 0.83% | 0.78% | 0.74% | 0.70% | 0.68% | 0.66% | 0.65% | 0.66% | 0.68% | 0.70% | 0.74% | 0.78% | 0.83% | 0.87% | 0.88% |
| 35 | 1.29% | 1.25% | 1.18% | 1.09% | 1.02% | 0.97% | 0.93% | 0.91% | 0.90% | 0.91% | 0.93% | 0.97% | 1.02% | 1.09% | 1.18% | 1.25% | 1.29% |
| 40 | 1.82% | 1.75% | 1.61% | 1.48% | 1.37% | 1.29% | 1.23% | 1.20% | 1.19% | 1.20% | 1.23% | 1.29% | 1.37% | 1.48% | 1.61% | 1.75% | 1.82% |
| 45 | 2.51% | 2.38% | 2.15% | 1.94% | 1.78% | 1.67% | 1.59% | 1.54% | 1.53% | 1.54% | 1.59% | 1.67% | 1.78% | 1.94% | 2.15% | 2.38% | 2.51% |
| 50 | 3.44% | 3.19% | 2.82% | 2.50% | 2.27% | 2.11% | 2.01% | 1.95% | 1.93% | 1.95% | 2.01% | 2.11% | 2.27% | 2.50% | 2.82% | 3.19% | 3.44% |
| 55 | 4.69% | 4.21% | 3.62% | 3.16% | 2.85% | 2.64% | 2.51% | 2.43% | 2.40% | 2.43% | 2.51% | 2.64% | 2.85% | 3.16% | 3.62% | 4.21% | 4.69% |
| 60 | | 4.58% | 3.95% | 3.52% | 3.25% | 3.09% | 3.00% | 2.96% | 3.00% | 3.09% | 3.25% | 3.52% | 3.95% | 4.58% | | | |
| 65 | | | 4.87% | 4.32% | 3.98% | 3.78% | 3.67% | 3.62% | 3.67% | 3.78% | 3.98% | 4.32% | 4.87% | | | | |
| 70 | | | | 4.82% | 4.60% | 4.47% | 4.41% | 4.47% | 4.60% | 4.82% | | | | | | | |
| 75 | | | | | | | | | | | | | | | | | |
| 80 | | | | | | | | | | | | | | | | | |
| 85 | | | | | | | | | | | | | | | | | |
| 90 | | | | | | | | | | | | | | | | | |

FIG. 3.9

Table 3.15 - Insolation potential on Roof Surfaces I (shed type)

| pg = 0.2 | N −180.0 | NNE −157.5 | NE −135.0 | ENE −112.5 | E −90.0 | ESE −67.5 | SE −45.0 | SSE −22.5 | S 0.0 | SSW 22.5 | SW 45.0 | WSW 67.5 | W 90 | WNW 112.5 | NW 135 | NNW 157.5 | N 180.0 |
|---|---|---|---|---|---|---|---|---|---|---|---|---|---|---|---|---|---|
| 0 | 95.0% | 95.0% | 95.0% | 95.0% | 95.0% | 95.0% | 95.0% | 95.0% | 95.0% | 95.0% | 95.0% | 95.0% | 95.0% | 95.0% | 95.0% | 95.0% | 95.0% |
| 5 | 92.6% | 92.8% | 93.3% | 94.0% | 94.8% | 95.7% | 96.4% | 96.5% | 97.0% | 96.5% | 96.4% | 95.7% | 94.8% | 94.0% | 93.3% | 92.8% | 92.6% |
| 10 | 89.7% | 90.0% | 91.1% | 92.4% | 94.3% | 95.9% | 97.3% | 98.2% | 98.5% | 98.2% | 97.3% | 95.9% | 94.3% | 92.6% | 91.1% | 90.0% | 89.7% |
| 15 | 86.3% | 86.9% | 88.5% | 90.8% | 93.3% | 95.8% | 97.7% | 99.0% | 99.5% | 99.0% | 97.7% | 95.8% | 93.3% | 90.8% | 88.5% | 86.9% | 86.3% |
| 20 | 82.5% | 83.4% | 85.6% | 88.7% | 92.1% | 95.2% | 97.7% | 99.4% | 100.0% | 99.4% | 97.7% | 95.2% | 92.1% | 88.7% | 85.6% | 83.4% | 82.5% |
| 25 | 78.4% | 79.5% | 82.4% | 86.4% | 90.5% | 94.3% | 97.3% | 99.2% | 99.7% | 99.2% | 97.3% | 94.3% | 90.5% | 86.4% | 82.4% | 79.5% | 78.4% |
| 30 | 73.9% | 75.4% | 79.0% | 83.8% | 88.6% | 93.0% | 96.4% | 98.6% | 99.4% | 98.6% | 96.4% | 93.0% | 88.6% | 83.8% | 79.0% | 75.4% | 73.9% |
| 35 | 69.1% | 70.9% | 75.4% | 81.0% | 86.5% | 91.3% | 95.0% | 97.4% | 98.4% | 97.4% | 95.0% | 91.3% | 86.5% | 81.0% | 75.4% | 70.9% | 69.1% |
| 40 | 64.0% | 66.4% | 71.7% | 78.1% | 84.2% | 89.3% | 93.2% | 95.8% | 96.8% | 95.8% | 93.2% | 89.3% | 84.2% | 78.1% | 71.7% | 66.4% | 64.0% |
| 45 | 58.7% | 61.7% | 68.0% | 75.0% | 81.6% | 87.0% | 91.0% | 93.7% | 94.8% | 93.7% | 91.0% | 87.0% | 81.6% | 75.0% | 68.0% | 61.7% | 58.7% |
| 50 | 53.2% | 57.1% | 64.2% | 71.9% | 78.8% | 84.4% | 88.5% | 91.1% | 92.2% | 91.1% | 88.5% | 84.4% | 78.8% | 71.9% | 64.2% | 57.1% | 53.2% |
| 55 | 47.6% | 52.6% | 60.6% | 68.7% | 75.9% | 81.6% | 85.5% | 88.1% | 89.3% | 88.1% | 85.5% | 81.6% | 75.9% | 68.7% | 60.6% | 52.6% | 47.6% |
| 60 | 42.1% | 48.5% | 57.1% | 65.5% | 72.8% | 78.5% | 82.3% | 84.7% | 85.8% | 84.7% | 82.3% | 78.5% | 72.8% | 65.5% | 57.1% | 48.5% | 42.1% |
| 65 | 38.0% | 44.9% | 53.8% | 62.3% | 69.7% | 75.2% | 78.7% | 80.9% | 82.0% | 80.9% | 78.7% | 75.2% | 69.7% | 62.3% | 53.8% | 44.9% | 38.0% |
| 70 | 36.9% | 41.1% | 50.6% | 59.2% | 66.4% | 71.7% | 74.9% | 76.8% | 77.8% | 76.8% | 74.9% | 71.7% | 66.4% | 59.2% | 50.6% | 41.1% | 36.9% |
| 75 | 35.8% | 39.5% | 47.7% | 56.0% | 63.1% | 68.1% | 70.9% | 72.4% | 73.3% | 72.4% | 70.9% | 68.1% | 63.1% | 56.0% | 47.7% | 39.5% | 35.8% |
| 80 | 34.7% | 37.5% | 45.0% | 53.0% | 59.8% | 64.4% | 66.8% | 67.7% | 68.4% | 67.7% | 66.8% | 64.4% | 59.8% | 53.0% | 45.0% | 37.5% | 34.7% |
| 85 | 33.5% | 35.7% | 42.4% | 50.0% | 56.4% | 60.6% | 62.5% | 62.8% | 63.3% | 62.8% | 62.5% | 60.6% | 56.4% | 50.0% | 42.4% | 35.7% | 33.5% |
| 90 | 32.4% | 34.1% | 40.1% | 47.1% | 53.1% | 56.9% | 58.1% | 57.7% | 57.9% | 57.7% | 58.1% | 56.9% | 53.1% | 47.1% | 40.1% | 34.1% | 32.4% |

Legend: 95%-100%, 90%-95%, 85%-90%, 0%-85%

FIG. 3.10

Table 3.16 - Insolation potential on Roof Surfaces II.

| pg = 0.2 | N | NNE | NE | ENE | E | ESE | SE | SSE | S | SSW | SW | WSW | W | WNW | NW | NNW | N |
|---|---|---|---|---|---|---|---|---|---|---|---|---|---|---|---|---|---|
| | -180.0 | -157.5 | -135.0 | -112.5 | -90.0 | -67.5 | -45.0 | -22.5 | 0.0 | 22.5 | 45.0 | 67.5 | 90 | 112.5 | 135 | 157.5 | 180.0 |
| 0 | 95.0% | 95.0% | 95.0% | 95.0% | 95.0% | 95.0% | 95.0% | 95.0% | 95.0% | 95.0% | 95.0% | 95.0% | 95.0% | 95.0% | 95.0% | 95.0% | 95.0% |
| 5 | 93.3% | 93.4% | 93.7% | 94.2% | 94.8% | 95.4% | 95.9% | 96.3% | 96.4% | 96.3% | 95.9% | 95.4% | 94.8% | 94.2% | 93.7% | 93.4% | 93.3% |
| 10 | 91.1% | 91.3% | 92.0% | 93.0% | 94.2% | 95.4% | 96.4% | 97.1% | 97.3% | 97.1% | 96.4% | 95.4% | 94.2% | 93.0% | 92.0% | 91.3% | 91.1% |
| 15 | 88.5% | 88.8% | 89.8% | 91.3% | 93.1% | 94.9% | 96.4% | 97.4% | 97.7% | 97.4% | 96.4% | 94.9% | 93.1% | 91.3% | 89.8% | 88.8% | 88.5% |
| 20 | 85.6% | 86.0% | 87.3% | 89.3% | 91.7% | 94.1% | 96.0% | 97.3% | 97.7% | 97.3% | 96.0% | 94.1% | 91.7% | 89.3% | 87.3% | 86.0% | 85.6% |
| 25 | 82.4% | 82.9% | 84.5% | 86.9% | 89.8% | 92.8% | 95.2% | 96.8% | 97.3% | 96.8% | 95.2% | 92.8% | 89.8% | 86.9% | 84.5% | 82.9% | 82.4% |
| 30 | 79.0% | 79.6% | 81.3% | 84.2% | 87.7% | 91.2% | 94.0% | 95.8% | 96.4% | 95.8% | 94.0% | 91.2% | 87.7% | 84.2% | 81.3% | 79.6% | 79.0% |
| 35 | 75.4% | 76.0% | 77.8% | 81.1% | 85.2% | 89.2% | 92.4% | 94.4% | 95.0% | 94.4% | 92.4% | 89.2% | 85.2% | 81.1% | 77.8% | 76.0% | 75.4% |
| 40 | 71.7% | 72.2% | 74.1% | 77.8% | 82.5% | 86.9% | 90.5% | 92.6% | 93.2% | 92.6% | 90.5% | 86.9% | 82.5% | 77.8% | 74.1% | 72.2% | 71.7% |
| 45 | 68.0% | 68.4% | 70.2% | 74.4% | 79.5% | 84.3% | 88.2% | 90.3% | 91.0% | 90.3% | 88.2% | 84.3% | 79.5% | 74.4% | 70.2% | 68.4% | 68.0% |
| 50 | 64.2% | 64.5% | 66.0% | 70.7% | 76.4% | 81.5% | 85.5% | 87.8% | 88.5% | 87.8% | 85.5% | 81.5% | 76.4% | 70.7% | 66.0% | 64.5% | 64.2% |
| 55 | 60.6% | 60.7% | 61.8% | 67.1% | 73.1% | 78.4% | 82.6% | 84.8% | 85.5% | 84.8% | 82.6% | 78.4% | 73.1% | 67.1% | 61.8% | 60.7% | 60.6% |
| 60 | 57.1% | 57.0% | 57.5% | 63.5% | 69.7% | 75.1% | 79.3% | 81.6% | 82.3% | 81.6% | 79.3% | 75.1% | 69.7% | 63.5% | 57.5% | 57.0% | 57.1% |
| 65 | 53.8% | 53.6% | 53.8% | 60.0% | 66.2% | 71.6% | 75.8% | 78.0% | 78.7% | 78.0% | 75.8% | 71.6% | 66.2% | 60.0% | 53.8% | 53.6% | 53.8% |
| 70 | 50.6% | 50.1% | 51.7% | 56.4% | 62.8% | 68.0% | 72.1% | 74.2% | 74.9% | 74.2% | 72.1% | 68.0% | 62.8% | 56.4% | 51.7% | 50.1% | 50.6% |
| 75 | 47.7% | 47.8% | 49.5% | 53.8% | 59.3% | 64.2% | 68.2% | 70.2% | 70.9% | 70.2% | 68.2% | 64.2% | 59.3% | 53.8% | 49.5% | 47.8% | 47.7% |
| 80 | 45.0% | 45.2% | 47.2% | 50.9% | 55.9% | 60.3% | 64.1% | 66.0% | 66.8% | 66.0% | 64.1% | 60.3% | 55.9% | 50.9% | 47.2% | 45.2% | 45.0% |
| 85 | 42.4% | 42.8% | 45.0% | 48.2% | 52.5% | 56.4% | 59.9% | 61.7% | 62.5% | 61.7% | 59.9% | 56.4% | 52.5% | 48.2% | 45.0% | 42.8% | 42.4% |
| 90 | 40.1% | 40.6% | 42.7% | 45.5% | 49.1% | 52.4% | 55.5% | 57.3% | 58.1% | 57.3% | 55.5% | 52.4% | 49.1% | 45.5% | 42.7% | 40.6% | 40.1% |

FIG. 3.11

Table 3.17 - Insolation potential on Roof Surfaces III.

| pg = 0.2 | N | NNE | NE | ENE | E | ESE | SE | SSE | S | SSW | SW | WSW | W | WNW | NW | NNW | N |
|---|---|---|---|---|---|---|---|---|---|---|---|---|---|---|---|---|---|
| | -180.0 | -157.5 | -135.0 | -112.5 | -90.0 | -67.5 | -45.0 | -22.5 | 0.0 | 22.5 | 45.0 | 67.5 | 90 | 112.5 | 135 | 157.5 | 180.0 |
| 95% - 100% | | | | | | | | | | | | | | | | | |
| 90% - 95% | | | | | | | | | | | | | | | | | |
| 85% - 90% | | | | | | | | | | | | | | | | | |
| 0% - 85% | | | | | | | | | | | | | | | | | |
| 0 | 95.0% | 95.0% | 95.0% | 95.0% | 95.0% | 95.0% | 95.0% | 95.0% | 95.0% | 95.0% | 95.0% | 95.0% | 95.0% | 95.0% | 95.0% | 95.0% | 95.0% |
| 5 | 94.1% | 94.1% | 94.3% | 94.5% | 94.8% | 95.1% | 95.3% | 95.5% | 95.6% | 95.5% | 95.3% | 95.1% | 94.8% | 94.5% | 94.3% | 94.1% | 94.1% |
| 10 | 92.7% | 92.8% | 93.1% | 93.6% | 94.2% | 94.7% | 95.2% | 95.6% | 95.7% | 95.6% | 95.2% | 94.7% | 94.2% | 93.6% | 93.1% | 92.8% | 92.7% |
| 15 | 91.0% | 91.2% | 91.6% | 92.2% | 93.1% | 93.9% | 94.7% | 95.2% | 95.4% | 95.2% | 94.7% | 93.9% | 93.1% | 92.2% | 91.6% | 91.2% | 91.0% |
| 20 | 88.9% | 89.1% | 89.7% | 90.5% | 91.5% | 92.7% | 93.7% | 94.4% | 94.7% | 94.4% | 93.7% | 92.7% | 91.5% | 90.5% | 89.7% | 89.1% | 88.9% |
| 25 | 86.5% | 86.7% | 87.4% | 88.4% | 89.6% | 91.0% | 92.3% | 93.3% | 93.7% | 93.3% | 92.3% | 91.0% | 89.6% | 88.4% | 87.4% | 86.7% | 86.5% |
| 30 | 83.7% | 84.0% | 84.8% | 85.9% | 87.3% | 89.0% | 90.6% | 91.8% | 92.2% | 91.8% | 90.6% | 89.0% | 87.3% | 85.9% | 84.8% | 84.0% | 83.7% |
| 35 | 80.7% | 81.1% | 81.9% | 83.1% | 84.7% | 86.6% | 88.5% | 89.9% | 90.5% | 89.9% | 88.5% | 86.6% | 84.7% | 83.1% | 81.9% | 81.1% | 80.7% |
| 40 | 77.4% | 77.9% | 78.9% | 80.1% | 81.7% | 83.8% | 86.1% | 87.7% | 88.4% | 87.7% | 86.1% | 83.8% | 81.7% | 80.1% | 78.9% | 77.9% | 77.4% |
| 45 | 74.0% | 74.6% | 75.7% | 76.8% | 78.4% | 80.8% | 83.3% | 85.2% | 86.0% | 85.2% | 83.3% | 80.8% | 78.4% | 76.8% | 75.7% | 74.6% | 74.0% |
| 50 | 70.3% | 71.1% | 72.3% | 73.4% | 74.8% | 77.5% | 80.4% | 82.5% | 83.3% | 82.5% | 80.4% | 77.5% | 74.8% | 73.4% | 72.3% | 71.1% | 70.3% |
| 55 | 66.5% | 67.6% | 68.9% | 69.8% | 70.9% | 74.1% | 77.2% | 79.5% | 80.3% | 79.5% | 77.2% | 74.1% | 70.9% | 69.8% | 68.9% | 67.6% | 66.5% |
| 60 | 62.6% | 64.2% | 65.5% | 66.2% | 66.9% | 70.6% | 73.9% | 76.2% | 77.2% | 76.2% | 73.9% | 70.6% | 66.9% | 66.2% | 65.5% | 64.2% | 62.6% |
| 65 | 59.1% | 60.8% | 62.1% | 62.7% | 63.2% | 67.0% | 70.4% | 72.8% | 73.8% | 72.8% | 70.4% | 67.0% | 63.2% | 62.7% | 62.1% | 60.8% | 59.1% |
| 70 | 56.6% | 57.3% | 58.7% | 59.0% | 60.4% | 63.2% | 66.8% | 69.2% | 70.2% | 69.2% | 66.8% | 63.2% | 60.4% | 59.0% | 58.7% | 57.3% | 56.6% |
| 75 | 54.0% | 54.5% | 55.4% | 56.0% | 57.4% | 60.0% | 63.2% | 65.5% | 66.5% | 65.5% | 63.2% | 60.0% | 57.4% | 56.0% | 55.4% | 54.5% | 54.0% |
| 80 | 51.4% | 51.6% | 52.2% | 52.7% | 54.3% | 56.5% | 59.5% | 61.7% | 62.6% | 61.7% | 59.5% | 56.5% | 54.3% | 52.7% | 52.2% | 51.6% | 51.4% |
| 85 | 48.8% | 48.8% | 49.1% | 49.5% | 51.1% | 53.0% | 55.8% | 57.8% | 58.7% | 57.8% | 55.8% | 53.0% | 51.1% | 49.5% | 49.1% | 48.8% | 48.8% |
| 90 | 46.2% | 46.0% | 46.1% | 46.3% | 47.8% | 49.6% | 52.1% | 53.9% | 54.7% | 53.9% | 52.1% | 49.6% | 47.8% | 46.3% | 46.1% | 46.0% | 46.2% |

FIG. 3.12

Table 3.18 - Insolation potential on Roof Surfaces IV (gable type).

| pg = 0.2 | N/S | NNE/SSW | NE/SW | ENE/WSW | E/W | ESE/WNW | SE/NW | SSE/NNW | N/S |
|---|---|---|---|---|---|---|---|---|---|
| 95% - 100% | | | | | | | | | |
| 90% - 95% | | | | | | | | | |
| 85% - 90% | | | | | | | | | |
| 0% - 85% | | | | | | | | | |
| 0 | 95.0% | 95.0% | 95.0% | 95.0% | 95.0% | 95.0% | 95.0% | 95.0% | 95.0% |
| 5 | 94.8% | 94.8% | 94.8% | 94.8% | 94.8% | 94.8% | 94.8% | 94.8% | 94.8% |
| 10 | 94.1% | 94.1% | 94.2% | 94.2% | 94.3% | 94.2% | 94.2% | 94.1% | 94.1% |
| 15 | 92.9% | 93.0% | 93.1% | 93.3% | 93.3% | 93.3% | 93.1% | 93.0% | 92.9% |
| 20 | 91.3% | 91.4% | 91.7% | 92.0% | 92.1% | 92.0% | 91.7% | 91.4% | 91.3% |
| 25 | 89.2% | 89.4% | 89.8% | 90.3% | 90.5% | 90.3% | 89.8% | 89.4% | 89.2% |
| 30 | 86.7% | 87.0% | 87.7% | 88.4% | 88.6% | 88.4% | 87.7% | 87.0% | 86.7% |
| 35 | 83.7% | 84.2% | 85.2% | 86.2% | 86.5% | 86.2% | 85.2% | 84.2% | 83.7% |
| 40 | 80.4% | 81.1% | 82.5% | 83.7% | 84.2% | 83.7% | 82.5% | 81.1% | 80.4% |
| 45 | 76.7% | 77.7% | 79.5% | 81.0% | 81.6% | 81.0% | 79.5% | 77.7% | 76.7% |
| 50 | 72.7% | 74.1% | 76.4% | 78.1% | 78.8% | 78.1% | 76.4% | 74.1% | 72.7% |
| 55 | 68.4% | 70.4% | 73.1% | 75.1% | 75.9% | 75.1% | 73.1% | 70.4% | 68.4% |
| 60 | 64.0% | 66.6% | 69.7% | 72.0% | 72.8% | 72.0% | 69.7% | 66.6% | 64.0% |
| 65 | 60.0% | 62.9% | 66.2% | 68.7% | 69.7% | 68.7% | 66.2% | 62.9% | 60.0% |
| 70 | 57.4% | 58.9% | 62.8% | 65.4% | 66.4% | 65.4% | 62.8% | 58.9% | 57.4% |
| 75 | 54.6% | 55.9% | 59.3% | 62.1% | 63.1% | 62.1% | 59.3% | 55.9% | 54.6% |
| 80 | 51.6% | 52.6% | 55.9% | 58.7% | 59.8% | 58.7% | 55.9% | 52.6% | 51.6% |
| 85 | 48.4% | 49.2% | 52.5% | 55.3% | 56.4% | 55.3% | 52.5% | 49.2% | 48.4% |
| 90 | 45.2% | 45.9% | 49.1% | 52.0% | 53.1% | 52.0% | 49.1% | 45.9% | 45.2% |

FIG. 3.13

Table 3.19 - Insolation potential on Roof Surfaces V (hip type).

| pg = 0.2  95%-100%  90%-95%  85%-90%  0%-85% | N/S | NNE/SSW | NE/SW | ENE/WSW | E/W |
|---|---|---|---|---|---|
| 0 | 0.0% | 95.0% | 95.0% | 95.0% | 95.0% |
| 5 | 0.0% | 94.8% | 94.8% | 94.8% | 94.8% |
| 10 | 0.0% | 94.2% | 94.2% | 94.2% | 94.2% |
| 15 | 0.0% | 93.1% | 93.1% | 93.1% | 93.1% |
| 20 | 0.0% | 91.7% | 91.7% | 91.7% | 91.7% |
| 25 | 0.0% | 89.8% | 89.8% | 89.8% | 89.8% |
| 30 | 0.0% | 87.7% | 87.7% | 87.7% | 87.7% |
| 35 | 0.0% | 85.2% | 85.1% | 85.1% | 85.2% |
| 40 | 0.0% | 82.4% | 82.5% | 82.3% | 82.4% |
| 45 | 0.0% | 79.3% | 79.5% | 79.2% | 79.3% |
| 50 | 0.0% | 76.1% | 76.4% | 75.8% | 76.1% |
| 55 | 0.0% | 72.7% | 73.1% | 72.2% | 72.7% |
| 60 | 0.0% | 69.3% | 69.7% | 68.4% | 69.3% |
| 65 | 0.0% | 65.8% | 66.2% | 64.8% | 65.8% |
| 70 | 0.0% | 62.2% | 62.8% | 61.9% | 62.2% |
| 75 | 0.0% | 59.0% | 59.3% | 58.8% | 59.0% |
| 80 | 0.0% | 55.6% | 55.9% | 55.7% | 55.6% |
| 85 | 0.0% | 52.3% | 52.5% | 52.4% | 52.3% |
| 90 | 0.0% | 48.9% | 49.1% | 49.1% | 48.9% |

FIG. 3.14

Mapunapuna Global Horizontal Insolation in GIS Platform

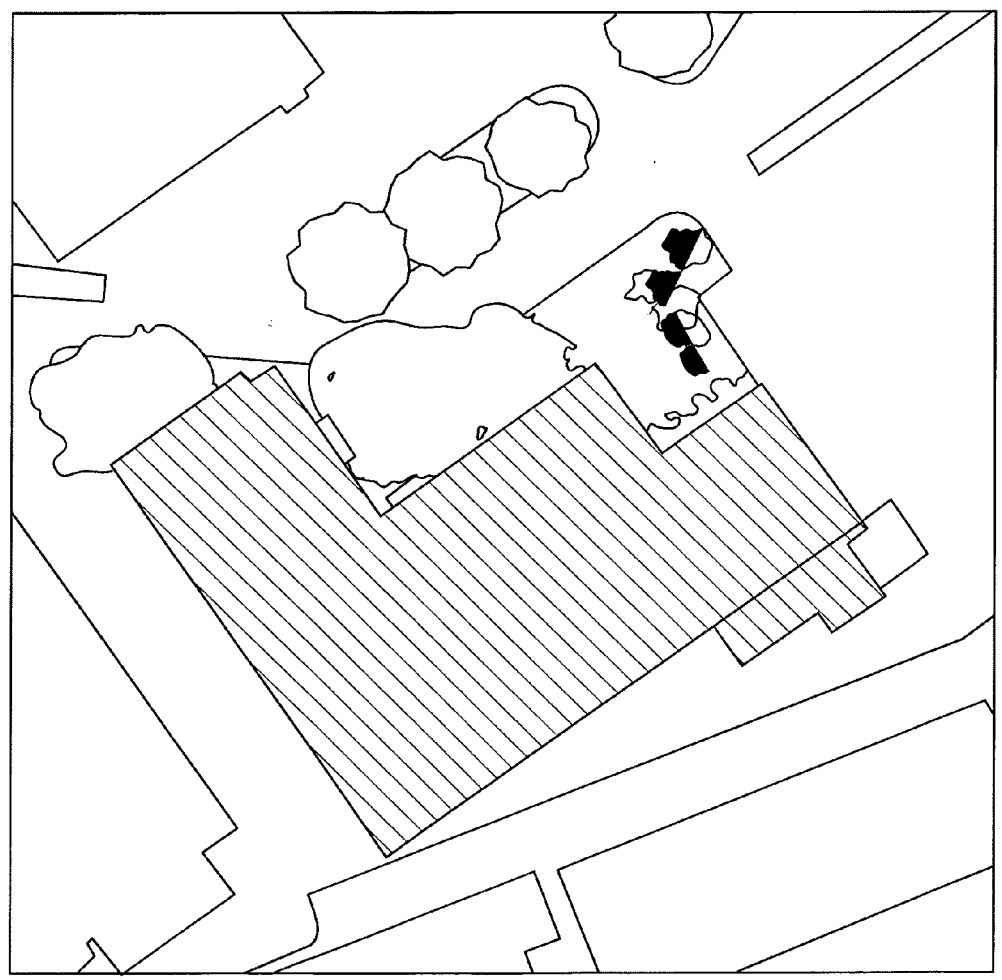
CAD Tracing. 1:3600 Scale.
FIG. 5.1

Table 5.2 - Comparison of Helianthus Model with Observed Data.

| Helianthus Honolulu pg = 20% | | | | | | | | | | | | | | |
|---|---|---|---|---|---|---|---|---|---|---|---|---|---|---|
| β | N | NNE | NE | ENE | E | ESE | SE | SSE | S | SSW | SW | WSW | W |
| 0.00 | -0.77% | -0.15% | -0.91% | -0.15% | -1.56% | -0.15% | -0.76% | -1.21% | -0.14% | -0.60% | -0.24% | -0.27% | -0.93% |
| 6.33 | -1.26% | -2.20% | -1.98% | -0.14% | -1.11% | -0.47% | -0.77% | -1.11% | -1.10% | -2.01% | -1.11% | -2.61% | -0.16% |
| 21.33 | -4.29% | -4.11% | -2.59% | -2.54% | -0.15% | -0.51% | -0.17% | -0.11% | -2.42% | -1.16% | -5.10% | -5.77% | -1.21% |
| 36.33 | -6.04% | -7.07% | -4.11% | -2.71% | -1.51% | 0.19% | -0.75% | -1.51% | -1.11% | -4.14% | -6.10% | -6.15% | -0.11% |
| 90.00 | -7.14% | -1.25% | -1.75% | 1.64% | 22.?% | 22.?% | 26.41% | 15.56% | 2.50% | -1.51% | 7.51% | -9.07% | 12.41% |

FIG. 5.2

Table 5.3 - Comparison of Perez Model with Observed Data.

| Perez Honolulu pg = 2 | | | | | | | | | | | | | | |
|---|---|---|---|---|---|---|---|---|---|---|---|---|---|---|
| β | N | NNE | NE | ENE | E | ESE | SE | SSE | S | SSW | SW | WSW | W |
| 0.00 | 1.54% | 0.21% | 0.91% | -1.16% | 0.61% | 1.54% | 0.00% | -0.11% | 1.19% | 0.40% | 2.61% | 1.51% | 0.74% |
| 6.33 | 0.70% | 0.60% | 1.25% | -0.14% | 1.41% | 1.09% | -0.15% | -0.46% | 2.46% | -0.19% | 0.19% | 2.61% | 1.64% |
| 21.33 | 2.16% | 2.11% | 2.76% | -1.16% | 2.20% | 0.51% | 0.00% | 0.12% | 2.90% | 0.51% | 1.11% | 2.92% | 0.70% |
| 36.33 | 1.02% | 1.55% | 1.90% | -0.91% | 1.12% | 0.19% | -1.12% | -1.05% | 2.50% | 0.69% | 1.67% | 1.65% | 1.45% |
| 90.00 | 5.24% | 5.00% | 4.17% | -0.45% | 4.67% | 1.41% | 4.29% | -1.67% | 2.50% | 1.01% | 1.95% | 1.95% | 2.07% |

FIG. 5.3

Table 5.4 - Comparison of HDKR Model with Observed Data.

| HDKR Honolulu pg = 2 | | N | NNE | NE | ENE | E | ESE | SE | SSE | S | SSW | SW | WSW | W |
|---|---|---|---|---|---|---|---|---|---|---|---|---|---|---|
| β | 0.00 | 1.54% | -0.21% | -0.91% | -1.16% | -0.61% | 1.54% | 0.00% | -0.11% | -1.19% | -0.40% | -2.61% | -1.51% | -0.74% |
| | 6.33 | 0.00% | -0.20% | -0.71% | -0.61% | 1.11% | 0.94% | -0.11% | -0.77% | 1.97% | -0.75% | -0.22% | 1.95% | 1.09% |
| | 21.33 | -0.12% | -0.55% | 0.21% | -2.71% | 1.19% | -0.17% | -0.67% | -0.11% | 1.45% | -1.40% | -0.91% | -0.11% | -0.11% |
| | 36.33 | -0.11% | -0.52% | 0.00% | -2.55% | -0.19% | -0.19% | -2.26% | -2.46% | -0.50% | -1.90% | -1.10% | -0.96% | -0.55% |
| | 90.00 | 1.57% | 4.00% | 5.94% | 5.94% | ??% | ??% | 19.79% | 5.51% | -4.29% | -0.54% | -0.24% | 1.16% | 4.14% |

FIG. 5.4

Table 5.5 - Comparison of Ecotect Model with Observed Data.

| Ecotect Honolulu pg = 2 | | N | NNE | NE | ENE | E | ESE | SE | SSE | S | SSW | SW | WSW | W |
|---|---|---|---|---|---|---|---|---|---|---|---|---|---|---|
| β | 0.00 | 1.15% | -0.19% | -0.19% | -2.71% | -0.47% | 0.77% | -1.21% | -2.62% | 1.16% | -2.40% | -0.91% | 0.27% | -0.91% |
| | 6.33 | 0.47% | -4.40% | -1.25% | -2.20% | 0.16% | 0.47% | -1.01% | -2.77% | 0.00% | -4.14% | -4.67% | -2.91% | -0.91% |
| | 21.33 | -1.02% | 5.95% | -2.59% | -4.51% | 0.15% | 0.51% | -0.17% | -1.94% | -0.65% | -5.96% | -?? | -?? | -1.11% |
| | 36.33 | -1.02% | 7.91% | -5.00% | -4.71% | 0.19% | -0.91% | -0.57% | -2.61% | -1.11% | -7.07% | -?? | -?? | -1.64% |
| | 90.00 | -4.52% | 7.75% | -5.00% | 1.16% | ??% | ??% | ??% | ??% | -4.64% | -7.01% | -?? | -?? | -1.11% |

FIG. 5.5

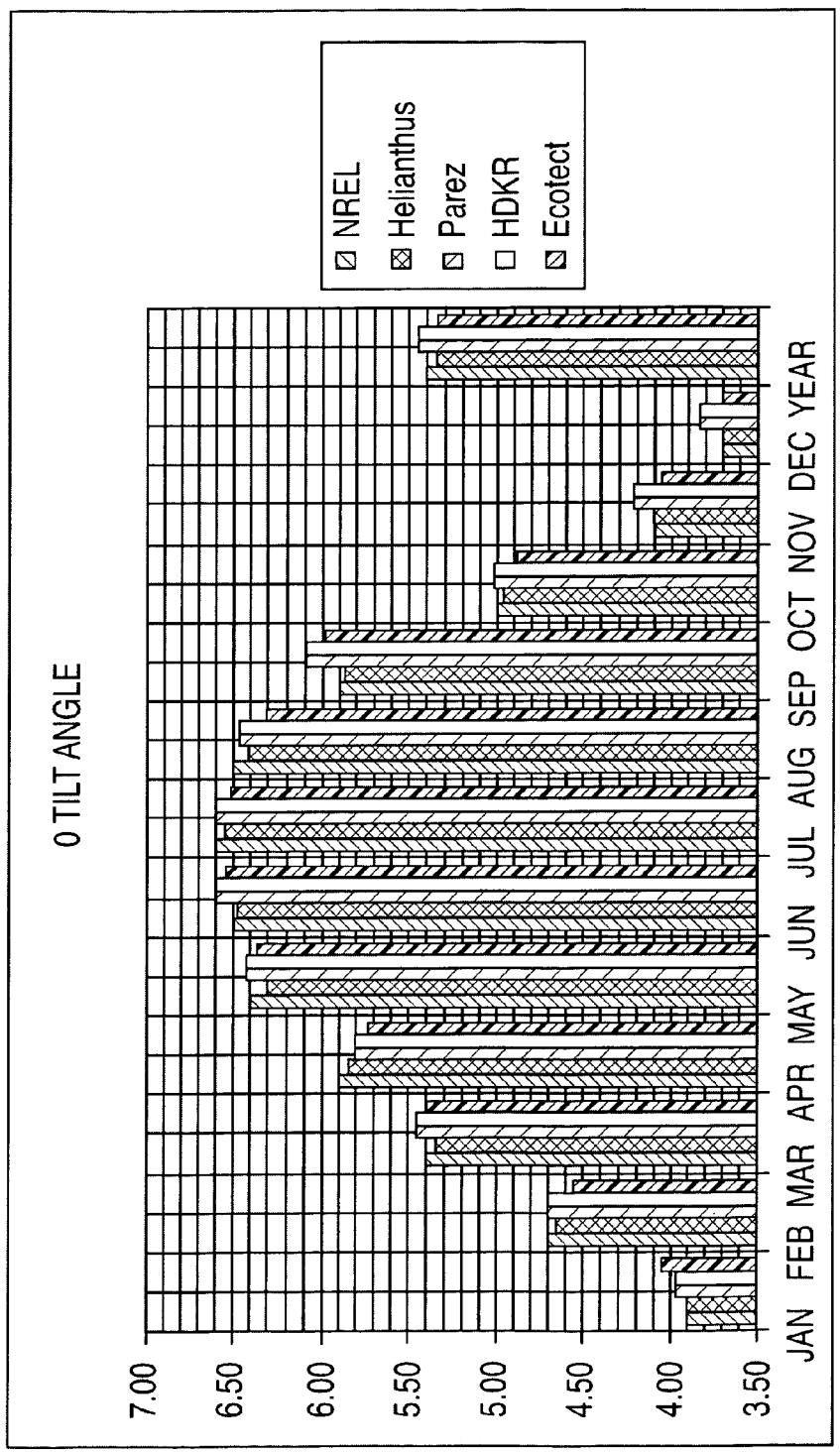
FIG. 5.6
Comparison of Insolation Models with Observed Data (NREL) for Surface Tilt of 0°. Monthly Average Daily Insolation in kWh/m² on Y Axis.

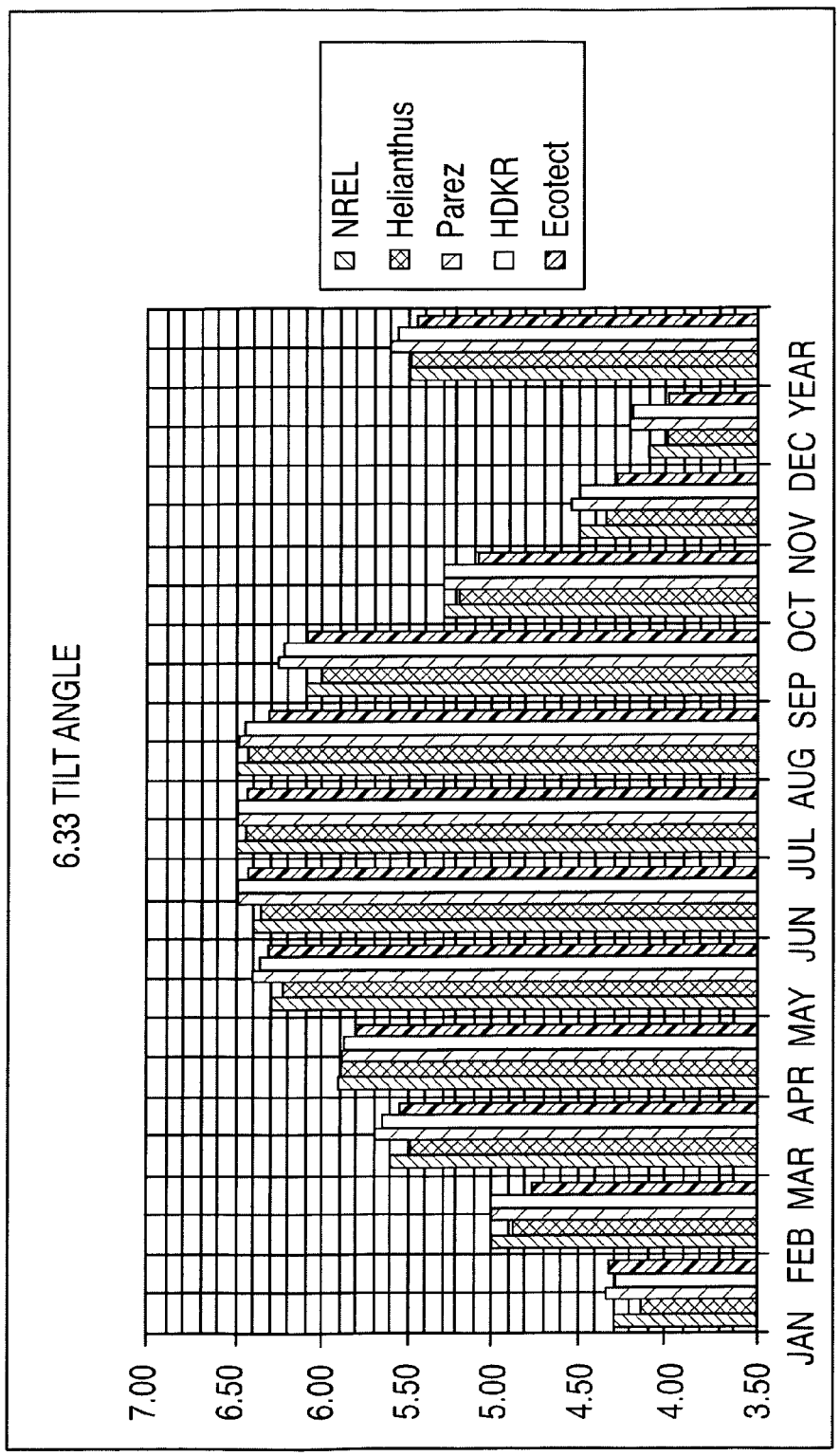
FIG. 5.7
Comparison of Insolation Models with Observed Data (NREL) for Surface Tilt of 6.33°. Monthly Average Daily Insolation in kWh/m² on Y Axis.

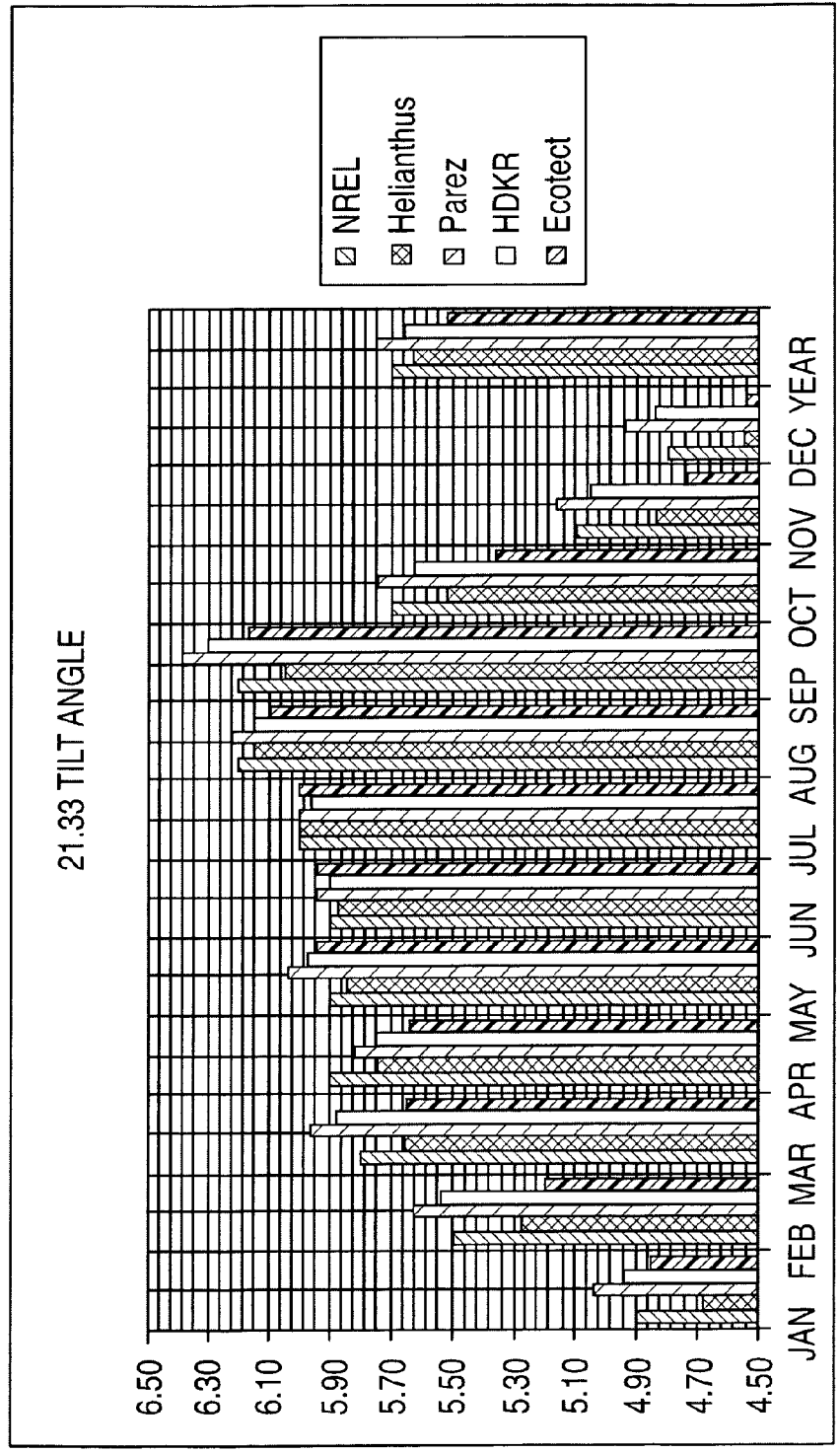
FIG. 5.8
Comparison of Insolation Models with Observed Data (NREL) for Surface Tilt of 21.33°. Monthly Average Daily Insolation in kWh/m² on Y Axis.

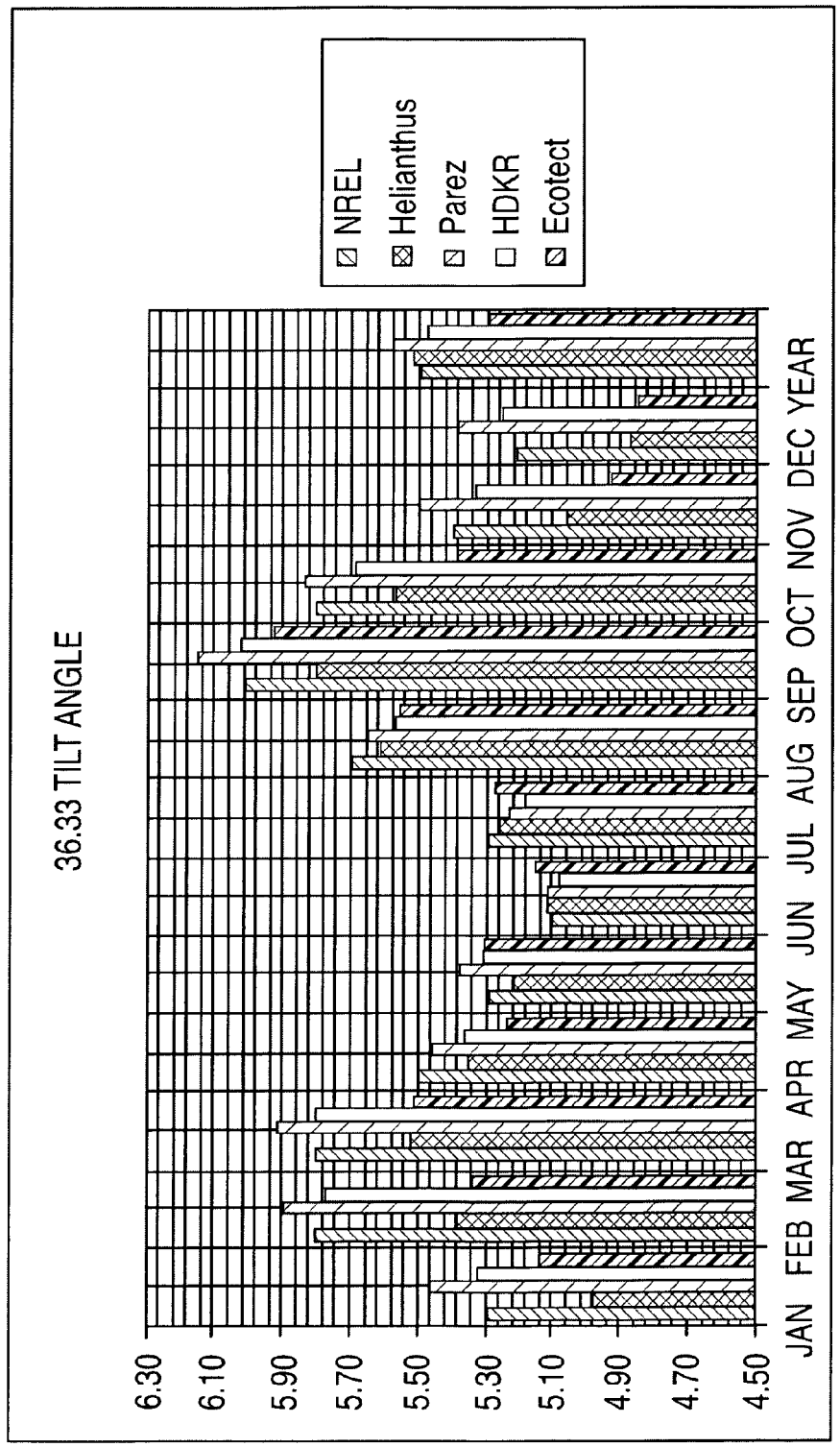
FIG. 5.9
Comparison of Insolation Models with Observed Data (NREL) for Surface Tilt of 36.33°. Monthly Average Daily Insolation in kWh/m² on Y Axis.

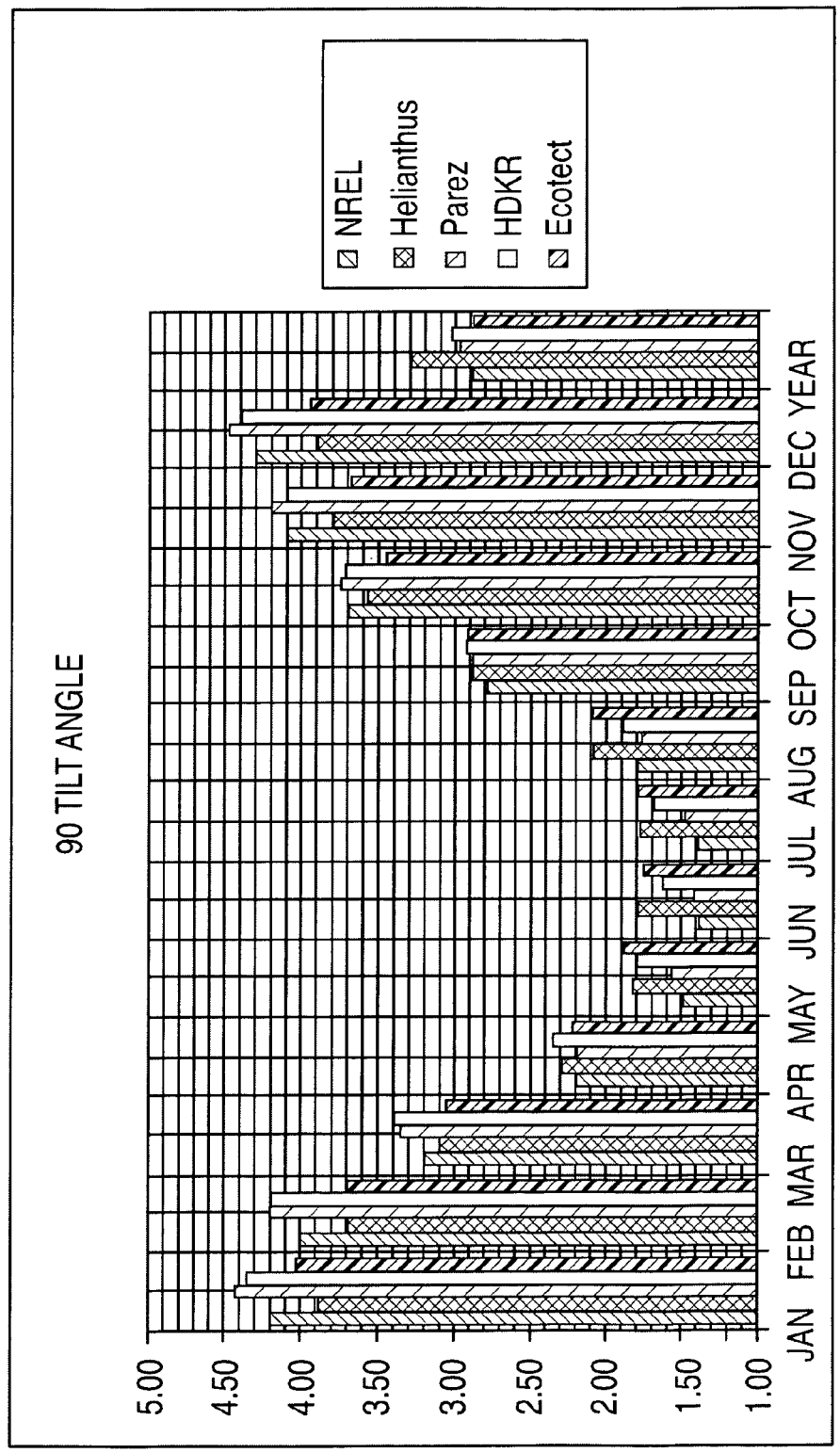
FIG. 5.10
Comparison of Insolation Models with Observed Data (NREL) for Surface Tilt of 90°. Monthly Average Daily Insolation in kWh/m² on Y Axis.

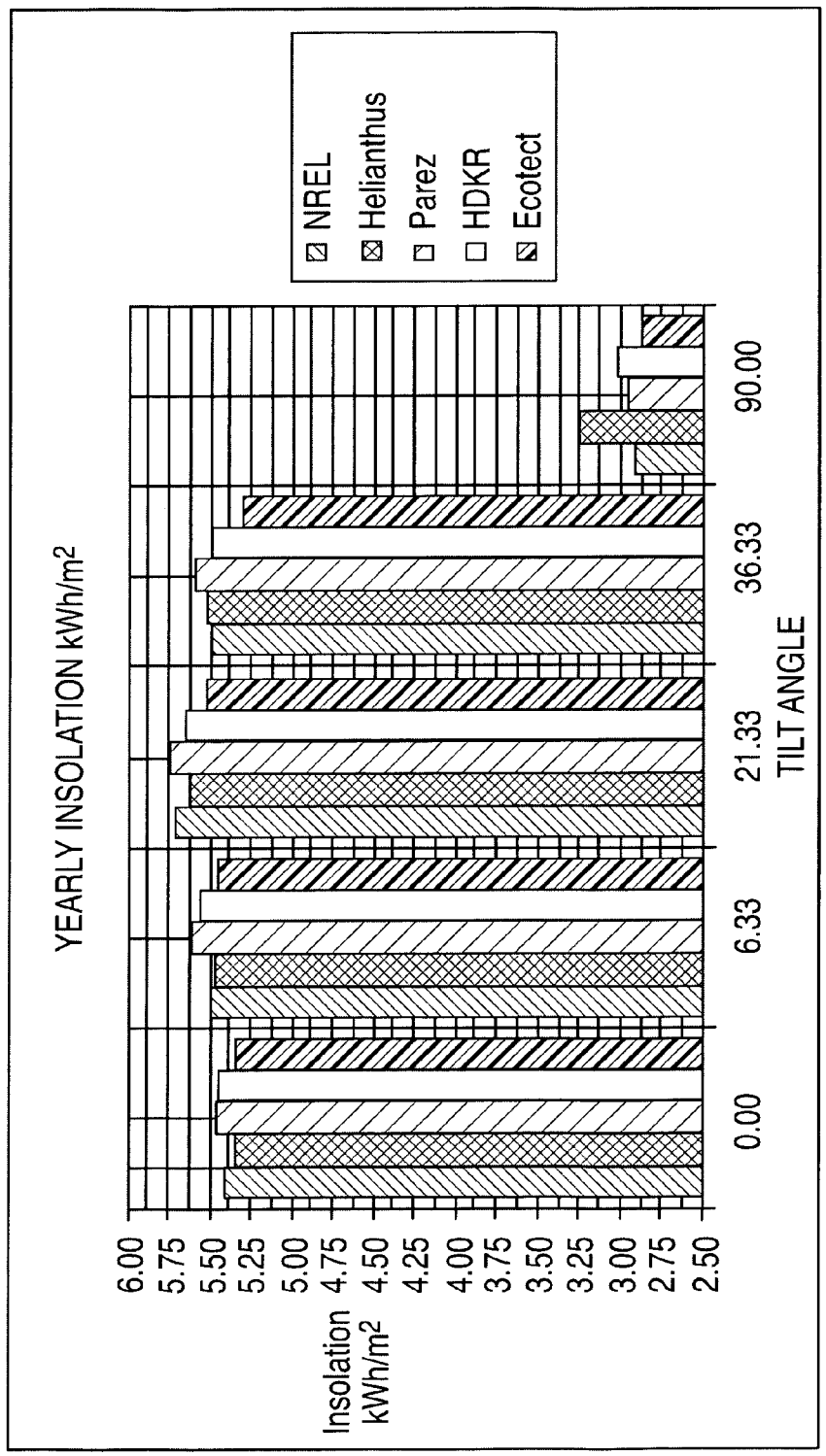
FIG. 5.11
Comparison of Insolation Models with Observed Data (NREL) for Annual Average Daily Insolation. Annual Average Daily Insolation in kWh/m² on Y Axis.

ASSESSMENT OF SOLAR ENERGY POTENTIAL ON EXISTING BUILDINGS IN A REGION

This U.S. patent application claims the priority of U.S. Provisional Application No. 60/485,967 filed on Jul. 8, 2003, of the same title, by the same inventors herein.

TECHNICAL FIELD

This invention generally relates to methods used to assess solar radiation potential on building rooftops.

BACKGROUND OF INVENTION

There has been general documentation and literature on remote sensing, range of methods (radar, optic, infrared, etc. . . . ) sensing equipment and application along with general and specific documentation and literature on environmental application of GIS and the use of GIS/satellite/aerial imagery in the analysis of the built environment. The report of the International Energy Agency (IEA) released in July 2002, entitled *Potential for Building Integrated Photovoltaic*, Report IEA-PVPS T7-4, discussed the assessment of solar potential on building rooftops. Their methods to assess rooftop surface areas employed gross calculations and was largely inaccurate. According to their method, rooftop surface areas are identified by multiplying the building footprint area by a factor determined by statistical observation of different building stock. Building footprint areas are largely determined by statistical survey of floor area per capita for different building type. The method remains statistical, overlooks the use of GIS technology and fails to recognize and verify the actual conditions in favor of a more abstract rooftop area analysis.

Other papers and reports have been directed to feature recognition coupled with GIS technology. It appears that the field of feature recognition from aerial photographs is still very much in its infancy beyond the range of current solar assessment methods, expertise, and technological capabilities. More accurate assessment methods through the synthesis of a variety of presently available technologies are desired.

SUMMARY OF INVENTION

In accordance with the present invention, a method for assessing solar insolation potential upon existing building rooftops in a given region comprises the following principal steps:

(a) Computing Global Horizontal Insolation values based on topographical Digital Elevation Model (DEM) data for the region;

(b) Computing a Sky Transmissivity parameter as it affects Global Horizontal Insolation based on available climate and cloud cover data for the region;

(c) Applying an Albedo parameter for ground reflectivity and scattering to determine Diffuse Insolation values;

(d) Applying a Shading Coefficient based on measuring shadow surface areas in relation to total area from aerial photographs of the region over defined times and periods;

(e) Determining Total Building Roof Area based on image analysis of aerial photographs of the region, and applying a typical roof slope factor;

(f) Estimating typical Roof Slope, Type, and Orientation (azimuth) selected from a defined set (vocabulary) of rooftop types based on a visual survey of the region; and (g) Calculating Total Building Rooftop Insolation Potential for the given region based upon said Global Horizontal Insolation values, Sky Transmissivity parameter, Diffuse Insolation values, Shading Coefficient, Total Building Roof Area, and typical Roof Slope, Type, and Orientation estimates.

Other objects, features, and advantages of the present invention will be explained in the following detailed description of the invention having reference to the appended drawings.

BRIEF DESCRIPTION OF DRAWINGS

FIG. 1 is an outline of the invention method of assessing solar radiation potential on building rooftops.

FIG. 2.1 shows the Mapunapuna District on the Island of Oahu, State of Hawaii, used as an example for application of the invention method.

FIG. 2.2 shows isolines of Mean Annual Insolation (cal/cm2/day) for the example of Oahu.

FIG. 2.3 shows Median Annual Rainfall on the Island of Oahu.

FIG. 3.1 shows a sample of a Scaled and Georeferenced Aerial Photograph Overlaid onto a GIS Map.

FIG. 3.2 illustrates Area Increase Factor versus Roof Tilt Angle.

FIG. 3.3 shows a Sample of Architectural Roof Typology.

FIG. 3.4 shows a Proposed Systematic Rooftop Vocabulary.

FIG. 3.5 illustrates typical Roof Pitches.

FIG. 3.6 is a Process Diagram

FIG. 3.7 shows Table 3.6 listing data for an example of Insolation versus Surface Tilt Azimuth Angles Matrix within Helianthus.

FIG. 3.8 shows Table 3.7 listing data for an example of Potential Insolation versus Surface Tilt Azimuth Angles Matrix within Helianthus.

FIG. 3.9 shows Table 3.13 listing data for examples of Computed Error Deviation Values.

FIG. 3.10 shows Table 3.15 listing data for Insolation Potential on Roof Surfaces (Shed Type).

FIG. 3.11 shows Table 3.16 listing data for Insolation Potential on Roof Surfaces II.

FIG. 3.12 shows Table 3.17 listing data for Insolation Potential on Roof Surfaces III.

FIG. 3.13 shows Table 3.18 listing data for Insolation Potential on Roof Surfaces IV FIG. 3.14 shows Table 3.19 listing data for Insolation Potential on Roof Surfaces V (Hip Type).

FIG. 5.1 illustrates a CAD Tracing at 1:3600 Scale.

FIG. 5.2 shows Table 5.2 listing data for Comparison of Helianthus Model with Observed Data.

FIG. 5.3 shows Table 5.3 listing data for Comparison of Perez Model with Observed Data.

FIG. 5.4 shows Table 5.4 listing data for Comparison of HDKR Model with Observed Data.

FIG. 5.5 shows Table 5.5 listing data for Comparison of Ecotect Model with Observed Data.

FIG. 5.6 shows a Comparison of Insolation Models with Observed Data (NREL) for Surface Tilt of 0°. Monthly Average Daily Insolation in kWh/m2 on Y Axis.

FIG. 5.7 shows a Comparison of Insolation Models with Observed Data (NREL) for Surface Tilt of 6.33°. Monthly Average Daily Insolation in kWh/m2 on Y Axis.

FIG. 5.8 shows a Comparison of Insolation Models with Observed Data (NREL) for Surface Tilt of 21.33°. Monthly Average Daily Insolation in kWh/m2 on Y Axis.

FIG. 5.9 shows a Comparison of Insolation Models with Observed Data (NREL) for Surface Tilt of 36.33°. Monthly Average Daily Insolation in kWh/m2 on Y Axis.

FIG. 5.10 shows a Comparison of Insolation Models with Observed Data (NREL) for Surface Tilt of 90°. Monthly Average Daily Insolation in kWh/m2 on Y Axis.

FIG. 5.11 shows a Comparison of Insolation Models with Observed Data (NREL) for Annual Average Daily Insolation. Annual Average Daily Insolation in kWh/m2 on Y Axis.

DETAILED DESCRIPTION OF INVENTION

Figure 4:
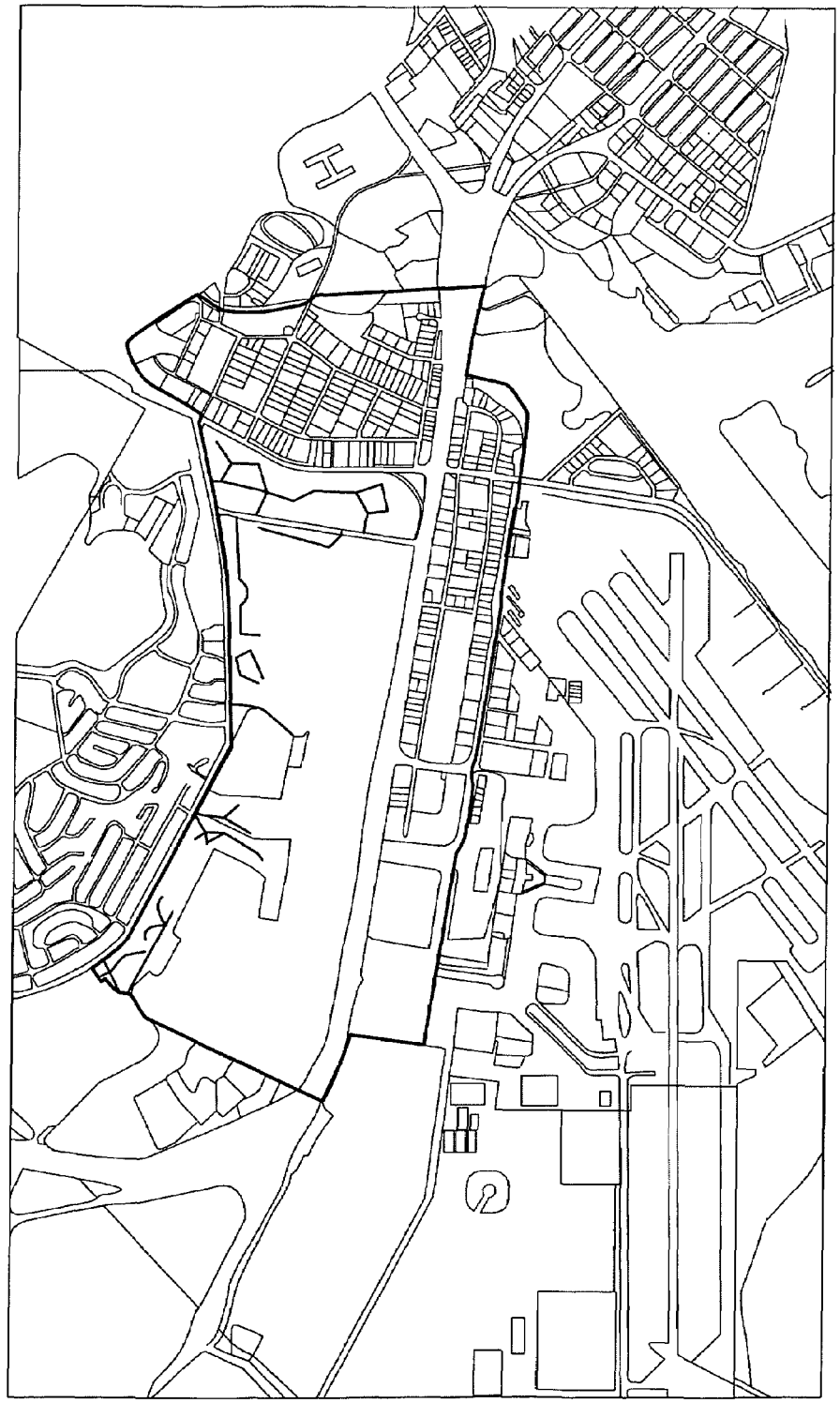
FIG. 4 shows the Mapunapuna Global Horizontal Insolation in the GIS Platform.

In the following description of the invention, certain terms are used having the following general meanings:

Anisotropic: not invariant with respect to direction. In the case of insolation models, refers to models that do not assume the diffuse and reflected radiation to be constant throughout the sky dome. Antonym=isotropic.

Average Day of the Month: the day having its daily global insolation closest to the monthly averaged extraterrestrial radiation.

Azimuth Angle: the horizontal angular distance from a reference direction, usually the northern point of the horizon, to the point where a vertical circle through a celestial body intersects the horizon, usually measured clockwise. Sometimes the southern point is used as the reference direction, and the measurement is made clockwise through 360°.

Diffuse Radiation: the solar radiation received from the sun after its direction has been changed by scattering by the atmosphere.

Digital Elevation Model (DEM): a digital file consisting of terrain elevations for ground positions at regularly spaced horizontal intervals.

Direct Radiation: the solar radiation received from the sun without having been scattered by the atmosphere.

Georeferenced: data referring to a latitude and longitude coordinate system.

Global Information System (GIS): a computer system for capturing, storing, checking, integrating, manipulating, analyzing and displaying data related to positions on the Earth's surface. Typically, a GIS is used for handling maps of one kind or another. These might be represented as several different layers where each layer holds data about a particular kind of feature (e.g. roads). Each feature is linked to a position on the graphical image of a map. Layers of data are organized to be studied and to perform statistical analysis (i.e. a layer of customer locations could include fields for Name, Address, Contact, Number, Area). Uses are primarily government related, town planning, local authority and public utility management, environmental, resource management, engineering, business, marketing, and distribution.

Isoline: a line on a map, chart, or graph connecting points of equal value.

Isotropic: identical in all directions. In the case of insolation models, refers to models that assume the diffuse and reflected radiation to be constant throughout the sky dome.

Julian Day: the number of days elapsed from the first day of the year; January $1^{st}$=1, December $31^{st}$=365.

Macroclimatic: referring to climate that lies just beyond the local modifying irregularities of landform and vegetation.

Megawatt: one million watts.

Mesoclimatic: referring to macroclimate modified by local irregularities of landforms, aspect, slope gradient, and vegetation.

Optimum Angle: the tilt or azimuth surface angle at which the maximum insolation is available at a particular location. In general, the optimum tilt angle is equal to the latitude angle of the location, facing toward the equator.

Orographic: pertaining to the physical geography of mountain and mountain range.

Orthorectification: the removing of the distortions caused by differences in terrain and object height on an aerial photograph, so that it appears "flat" as a map.

Solar Constant: the energy from the sun, per unit time, received on a unit area of surface perpendicular to the direction of propagation of the radiation, at mean earth-sun distance, outside of the atmosphere.

Solar Insolation: the amount of solar energy received on a given area measured in kilowatt-hours per square meter—this value is equivalent to peak sun hours.

Solar Time: time based on the apparent angular motion of the sun across the sky, with solar noon the time the sun crosses the meridian of the observer.

Tilt Angle: the angle between the plane of the surface in question and the horizontal.

Described herein are the methods used in accordance with the invention to assess solar radiation potential on building rooftops, the means by which the methods are carried out, and the procedure employed to systematize the means and methods into an efficient, working process. As an example of applying the invention method, a study was undertaken to measure the solar radiation potential on building rooftops in the Mapunapuna district of the Island of Oahu, in the State of Hawaii, which has a mix of industrial, commercial, and residential buildings, thus offering a good cross-section of building types.

The overall steps of the invention method are outlined in FIG. 1, encompassing the following sequence of tasks to be performed:

1. Acquisition of aerial photographs of the area of study.

2. Acquisition of GIS layers and Digital Elevation Models (DEM).

3. Scaling and georeferencing of the aerial photographs to GIS layers.

4. Identification and sizing of rooftop areas within the area of study.

5. Identification of rooftop orientation within GIS platform.

6. Field survey to identify and verify rooftop areas, typologies and slope angles (pitch).

7. Adjustment of rooftop areas from slope angle.

8. Identification of horizontal global insolation within area of study.

9. Assessment of insolation on existing building rooftops.

The method can be performed using the following commercially-available software and hardware: Dell Precision 340, Pentium 4, 1.90 Ghz desktop computer; ArcView GIS 3.2 platform software; ArcView Spatial Analyst GIS extension software; ArcView Image Analysis GIS extension software; Hemisoft Solar Analyst GIS extension software; Microsoft Excel 2000 spreadsheet software; and Autodesk AutoCAD 2000 software.

The following lists the documents, digital data, maps and photographs of primary importance in the study, as well as their use and limitation:

A "sunshine map", or solar calorie map, was obtained from the State Department of Planning and Economic Development, Energy Division, 1985. The solar insolation map of Oahu, Hi., developed in the late 1970's, was derived from insolation data measured on the island [FIG. 2.2]. One can observe that the isolines of mean annual solar insolation computed on the map ostensibly resemble the mean annual precipitation contour lines of the island [FIG. 2.3], inferring a correlation between precipitation and insolation. The data were recorded by about 40 stations, more or less evenly distributed throughout. The recording stations are, for the majority, located within the low elevation regions of the island (the coastal area and the central valley), avoiding the main mountain ranges and their steep overshadowing valleys. This can be explained by the nature of the recording stations, originally set up for agricultural purposes; the growing of crops such as sugar cane and pineapple demands high level of solar insolation (sugar cane is one of the most efficient plant known to transform sunlight into biomass, and both plants are very well adapted to high temperatures). This somewhat bias distribution of recording stations over the island unfortunately excluded many regions from insolation measurements. The lack of data over a wider range of microenvironments makes the insolation map a mere tool for an approximate evaluation of annual solar insolation. In ecological terminology, the presently distributed State insolation map is representative of a macroclimatic scale. For research and studies concerned with the effects of topographic overshadowing over surface insolation, a more accurate source of data associated with mesoclimatic parameters is indispensable.

Solar insolation data were also acquired through the National Solar Radiation Data Base (NSRDB), directed by the National Renewable Energy Laboratory (NREL), which contain insolation data for over 230 major cities throughout the United States. The data presented by the NSRDB were collected from 1961 to 1990 and are expressed in kWh/m2/day. The insolation values presented by the NSRDB are assigned with a ±9% uncertainty for Honolulu, Hi. Most data (93%) available through the NSRDB have been modeled, while 7% are actual field measurements, including Honolulu, Hi. Unfortunately, these data are only specific to these cities harboring the station. While interpolation can be performed to estimate solar insolation over near-by towns, this doing does not consider micro-climatic environmental conditions, nor overshadowing caused by topographic relief in uneven terrains. Thus, this solar insolation resource presents some limitations in the desired level of accuracy wished for the project. The insolation data for Honolulu were gathered from the weather station WBAN N° 22521 based at the Honolulu International Airport, at a latitude angle of 21.33° and longitude angle of 157.92°. The insolation data were recorded on surface angles of 0° (flat), latitude, latitude ±15° and 90° (vertical). The insolation data for horizontal surface was used in the project to calibrate the Solar Analyst GIS extension software to correct sky transmittivity index.

Numerous GIS layers were obtained from the City and County of Honolulu GIS website. These layers, in shape file format, constitute a geographical and metrical frame of reference to the GIS-based research. These layers, including major roads, land plots (tax map) and infrastructure man holes, allow the accurate scaling and georeferencing of superimposed aerial photographs from which rooftop areas are identified. Other GIS layers offer important information such as zoning ordinance and land use. A solar insolation layer, is also available for GIS use, but is based on, and has the same limitations as the previously mentioned map.

The scales of the aerial photographs will determine the level of accuracy by which image analysis software is enabled to identify rooftop areas. The research team acquired an aerial photograph of the industrial zone of Mapunapuna. The photograph is at a 1:3600 scale (1"=300'), which works very well with the image recognition software, and rooftop areas can be identified quite accurately. They are, however, best used for studies encompassing small areas (city block, neighborhood . . . ), as their relatively high cost would prohibit their use for regional analysis. Image recognition tests utilizing smaller scale aerial photographs, such as 1:48000 (1"=4,000') provided an adequate, although less accurate level of accuracy in the identification of building rooftops. Many of these later photographs have been acquired to performed the required tasks of the project.

Various publication and literature on solar radiation modeling calculations were evaluated and cross-referenced in order to develop a computer program capable of computing insolation values for any surface tilt and azimuth angles. A complete list of the reviewed literature appears in Appendix D below.

The research team made use of a GIS-driven image recognition program called Image Analysis, developed and distributed by the Environmental System Research Institute, INC. (ESRI). The software is capable of identifying pixel properties from an imported photograph. Thus, the user can inquire the software to identify all the pixels of a photograph matching particular properties. These can be preset by selecting a pixel sample, representative of the desired properties. The user is able to manipulate the level of precision with which the software will match the sample. Adjusting this fuzziness factor allows the computer to select pixels that are exactly like the sample, somewhat like the sample, or kind of like the sampled pixels. The user has to experiment with this adjustment to determine what level of precision is most appropriate to successfully identify the required pixels.

Walking and driving surveys were done throughout the Mapunapuna district area. The purpose of these field surveys was to take on-site measurements/frame of references of ground features to identify accurate scaling of aerial picture, accuracy of GIS layers on which aerial photographs are scaled and georeferenced, and to assess the accuracy of the Image Analysis software by comparing results to AutoCAD tracings. It also was used to identify homogeneous neighborhoods of the district, classified by land use and zoning, as well as rooftop characteristics.

As a useful application of assessing the total solar insolation potential, the total potential of building-applied photovoltaic power generation in the selected sector is to be estimated. Incident insolation as well as solar energy electric potential were modeled and computed through a solar radiation modeling program developed by the research team for each identified sector of the Mapunapuna district. The results were computed from the rooftop areas of the building stock, their roof pitch, orientation and geometry, as well as the annual average global insolation on horizontal surface of the different sectors, accounting for orographic overshadowing of the area. The insolation values were computed for total annual averages, although monthly averages can be computed as well. The insolation values can be translated into potential electrical energy production. Potential for water-heating solar thermal systems was not assessed in the project due to the higher complexity of translation from insolation values.

Acquisition of Aerial Photographs of the Area of Study:

Aerial photographs come in different scales. While a scale of 1:3600 (1"=300') offers high level of accuracy for image analysis, the high cost of such photographs and their moderate availability limits their use to single building or city block rooftop insolation assessments. These detailed aerial photographs can be purchased from specialized businesses. For rooftop insolation assessment of larger areas (city districts, neighborhood) such as the chosen Mapunapuna district of Honolulu, smaller scale aerial photographs can be acquired. Aerial photographs scaled at 1:48000 (1"=4,000') were used for the research herein. While not offering the same level of accuracy as larger scales, they allow large areas to be analyzed and assessed for insolation. Because most aerial photographs need to be scaled and georeference to a GIS layer, the use of a single small scale photograph renders the assessment process quicker than with the use of larger scale photographs. Furthermore, their cost is generally lower and they are more widely available than their large-scale counterpart. The use of Digital Orthophoto Quadrangles (DOQ) produced by the USGS can present a good compromise for future assessments. DOQs are aerial photographs encompassing an area of about 25 square miles, at a 1:40000 scale (1"=3,333'). This scale, although still considered quite small, might present a good medium for insolation assessment. The DOQs are orthorectified, which means that the image displacement (parallax) caused by terrain relief and camera tilts has been removed, i.e., the picture appears as if taken exactly normal to the ground plane everywhere on the photograph. This image rectification eliminates any perspective distortion associated with ordinary aerial pictures. The accuracy in sizing surface areas by the image recognition software is thus improved. Because the DOQs represent a quart of a USGS quadrangle (their extent are 3.75 minutes of an arc, while quadrangle are 7.5 minutes), they can facilitate the organizational process of extensive area of study and are easily georeferenced (more on that in the following section). Unfortunately, while DOQs are readily available for many states, they have not yet been created for the State of Hawaii.

Acquisition of GIS Layers and Digital Elevation Models (DEM):

The GIS layers onto which aerial photographs are scaled and georeferenced for the project were obtained from public sources. GIS layers are used as frame of reference to georeferencing and scaling of aerial photographs as well as providing useful information about the area of study, such as land use and zoning, tax map key numbers, property area etc. A Digital Elevation Model (DEM) of the island of Oahu was also acquired for the research. DEMs are digital three-dimensional maps that can be viewed in GIS-based software. Unlike two-dimensional GIS layers in shapefile format, DEMs have elevation information for any point of the map. The DEM acquired by the research team offer an accuracy level of ten meters, meaning that the map is divided into 10 meters by 10 meters cells. Each cell has an elevation value attached to it, accurate to 1 meter. The DEM plays an important role in the identification of precise insolation levels, and is required for the creation of digital solar maps when used with the Solar Analyst GIS extension. The DEM gives information about land-feature elevation (topography), which allows for the identification of orographic shadowing (shade created by mountain range, hills etc) and diminished insolation values. Due to their large amount of contained information, DEMs are generally quite large in size—the DEM of Oahu approaches the 200 megabytes. The use of DEMs in the Solar Analyst GIS extension will be explored in a subsequent paragraph.

Scaling and Georeferencing of the Aerial Photographs to GIS Layers:

Once the aerial photograph has been acquired, it must be scaled and georeferenced into the GIS software (unless this task was done by the distributor of the photograph). Scaling within the GIS program is necessary so that the computer can identify and calculate surface areas corresponding to actual dimensions. To accomplish this task, one must acquire actual field dimensions of areas or objects that appear in the photo, and scale the photograph accordingly. GIS layers, already scaled, offer a fast and accurate reference to scaling. Alternatively, field surveys might have to be done in close-by areas to measure some key features easily recognized on the photograph. For distant regions, or where field surveys are not practical, one should estimate measurements, based on standard dimension (cars, buses, street width, parking stalls, sidewalks etc. . . . ).

Georeferencing means to reference the photograph to known geographical features. This entails orienting the photograph so that each feature in the picture can overlay its respective attribute on an area map of the area; i.e., a road on the photograph would follow the same road on the map it overlays. See FIG. 3.1 for an example of a scaled and georeferenced aerial photograph overlaid onto a GIS map of the same area. This process helps in the accurate scaling of the picture while permitting further exploration of the photograph within a GIS platform. When DOQs from the USGS are used, no scaling or georeferencing need to be done, which can save the user considerable time when processing large areas.

Identification and Sizing of Rooftop Areas within the Area of Study:

The means of identifying and sizing rooftop areas from aerial photographs were presented previously. For the project, the research team concentrated on identifying building rooftop areas from six specific, homogeneous neighborhood (sectors) of the Mapunapuna district.

These neighborhoods were defined by their land use and zoning characteristics, as well as their roof surface distinctiveness (as identified from field surveys and aerial photographs).

Once obtained, aerial photographs of the Mapunapuna district were scaled and georeferenced to the City & County of Honolulu GIS layers, assuring consistency in the procedures, and reasonable measurement accuracy.

Each sector was processed with the Image Analysis GIS extension software to scale and identify the existing building rooftop areas. Each rooftop area is then combined to obtain a total rooftop surface area for a particular sector.

The following table presents the total rooftop surface area as identified during the field surveys of the Mapunapuna district:

TABLE 3.1

Total Rooftop Area in the Mapunapuna District.

| Sector | Total Rooftop Area (m²) | Total Rooftop Area (acres) |
|---|---|---|
| 1 | 25,332 | 6.3 |
| 2 | 236,698 | 58.5 |
| 3 | 13,220 | 3.3 |
| 4 | 12,806 | 3.2 |
| 5 | 29,479 | 7.3 |
| 6 | 4,613 | 1.1 |

These surface area figures are the not adjusted for slope angle, i.e., they represent the surface area as flat, and do not consider the increase in area with increase in roof tilt angle (pitch). Adjustment of these raw surface area figures is discussed in a following paragraph.

Identification of Rooftop Orientation within GIS Platform:

The orientation of single building rooftops can easily determined through the GIS platform, as photographs are georeferenced to GIS layers. The knowledge of the orientation or azimuth angle of the rooftop surfaces is required to precisely model the amount of insolation incident on that surface. Complication thus arises when assessing insolation incident on a multitude of roofs, oriented towards different directions. The research team settled on offering a range of insolation values specific to an area. This range represents the variation of rooftop orientation (amongst other rooftop characteristics) within the area of study. It will later be shown that the amplitude of this range can be quite marginal when assessing insolation on regular residential or industrial roof pitches.

For areas with homogeneous rooftop orientation, the latter can be easily identified through an angle calculator within the GIS platform.

The following table presents the rooftop range of orientations as identified during the field surveys of the Mapunapuna district:

TABLE 3.2

Roof Orientation in the Mapunapuna District.

| Sector | Roof Orientation† |
|---|---|
| 1 | 0° to 360° |
| 2 | 0° to 360° |
| 3 | 0° to 360° |
| 4 | 0° to 360° |
| 5 | 0° to 360° |
| 6 | 0° to −45° |

†Due south = 0°, due north = 360°, due east = −90°, due west = 90°.

Field Survey to Identify Rooftop Typologies and Slope Angles (Pitch):

Perhaps more so than roof orientation, roof slope affects the amount of incident insolation. Unlike previously thought, roof slope angle, or pitch, could not be identified through aerial photographs and image recognition software. Field surveys in the Mapunapuna area were then an important step in the overall procedure. During these surveys, sectors are defined by the homogeneity of their rooftop characteristics. Residential areas, for example, can be easily classified by the typology of the dominant rooftop. As many developments use a cookie-cutter design principle, most houses located within a development will feature similar roof slope angles and typologies (gables, hip, shed roofs etc.). Such homogeneous sectors are identified during the field surveys and a roof typology and slope angle was assigned to each. When roof slope differed within the sector, the range of variation was noted. This results in a range of insolation value, compiled with the range of roof orientation.

The following table presents the roof slope angles and typologies as identified during the field surveys of the Mapunapuna district:

TABLE 3.3

Roof Slope and Typology in the Mapunapuna District.

| Sector | Roof Pitch | Roof Slope Angle | Adjusted Slope Angle | Roof Typology |
|---|---|---|---|---|
| 1 | 1/12 | 4.8° | 5.0° | Gable |
| 2 | 0/12-4/12 | 0°-18.4° | 0°-20° | Gable |
| 3 | 4/12 | 18.4° | 20.0° | Gable |
| 4 | 3/12 | 14.0° | 15.0° | Gable |
| 5 | 4/12 | 18.4° | 20.0° | Gable |
| 6 | 3/12 | 14.0° | 15.0° | Shed |

The roof slope angles were adjusted to the nearest $5^{th}$ degree to simplify their identification within the rooftop vocabulary discussed in a subsequent paragraph.

Adjustment of Rooftop Areas from Slope Angle:

As mentioned in a prior paragraph, aerial photographs analyzed through GIS offer a two dimensional view of the building rooftops within an area. While the Image Analysis GIS extension can identify the surface area of these rooftops to a satisfactory level of accuracy, it is not (yet) able to identify their slope angle. This lack of information leads to errors in the identification of actual surface area. The software, in other words, assumes that all surfaces have a surface tilt angle of 0° (flat).

This problem can be overcome by multiplying the identified surface area by a determined factor, according to the known roof tilt angle. This factor is determined by the equation $y=1/\cosine(x)$ where y is the increase factor and x is the known roof tilt angle [see FIG. 3.2]. As an example, if the GIS software identifies a rooftop surface area to be 1,000 square feet, the actual surface area will be 1,250 square feet if the roof has a tilt angle of 36.8° (a pitch of 9/12).

Since the slope angles of the rooftops have been identified during the field survey, a slope angle factor was easily tagged to each identified total surface area for each analyzed sector of the Mapunapuna district. The slope factors and the resultant total surface area are as follow:

TABLE 3.4

Slope Factor and Adjusted Total Rooftop Area in the Mapunapuna District.

| Sector | Slope Factor | Total Rooftop Area (m²) |
|---|---|---|
| 1 | 1 | 25,332 |
| 2 | 1 to 1.06 | 236,698 to 250,899 |
| 3 | 1.06 | 14,013 |
| 4 | 1.04 | 13,318 |
| 5 | 1.06 | 31,247 |
| 6 | 1.04 | 4,797 |

Identification of Horizontal Global Insolation within Area of Study:

In order to assess the insolation incident on tilted surfaces, such as rooftops, most solar radiation modeling programs require a base value from which to derive insolation values.

This base value is the global insolation on a horizontal surface (flat), including both direct and diffuse solar radiation values. While this important piece of data is readily available for numerous cities, it does not account for mesoclimatic factors such as orographic overshadowing, particularly prominent within the deep valleys surrounding Honolulu.

The research team acquired a GIS extension, Solar Analyst that enables the identification of solar radiation incident on any terrain, and accounting for the shadow effect caused by its topography.

Solar Analyst is designed and distributed by the Helios Environmental Modeling Institute, LLC (HEMI). This GIS extension is a key element to the project research method herein. Indeed, this tool enables the user to compute global insolation values incident upon any terrain slope and aspect, for any location. Furthermore, the program takes into consideration the topographic features of the terrain, thus creating accurate insolation maps, derived for any time duration (e.g., day, week, month, year . . . ).

Once a DEM is imported into ArcView GIS, the Solar Analyst computes insolation value, as well as a shading mask for every cell of the map (a good DEM will have a resolution 10 $m^2$ per cell). The shading mask is calculated based on the topography surrounding each cell. From these calculations, the Solar Analyst is able to identify the actual amount of solar radiation received on ground surfaces, whether located in deep, shaded valleys, or flat, exposed areas.

Such program will provide a global insolation value (solar radiation on flat terrain) for any location, thus enabling further modeling of tilted surface insolation through a insolation modeling program. If building roof surfaces were imported as a DEM, Solar Analyst would compute insolation upon these surfaces as well. Unfortunately, DEM of building features are yet to become readily available. Future research developments will investigate such promising process.

The Solar Analyst requires very few input data to perform its calculation. Asides from DEM input, the program requires a site latitude and a time-period for which it will compute insolation. It will then require the input of two important values: the transmittivity of the atmosphere at that particular location, as well as the diffuse proportion of the global normal radiation. These two values were obtained by using the NREL data for the Honolulu airport to calibrate the Solar Analyst.

The program makes use of a simple solar radiation model that starts with a solar constant of 1367 W/m2, then introduces the transmittance and diffuse proportion variables to compute direct, diffuse and global insolation. Latitude and time-duration variables are used to calculate the solar geometry, while the DEM provides elevation value, necessary for the computation of the air mass and shading mask.

Since most solar radiation modeling program require a global insolation value as a starting point to compute insolation on tilted surfaces, the Solar Analyst becomes a crucial tool to the study. Furthermore, it answers the problem of orographic shadowing, enabling a more realistic evaluation of solar radiation in rugged terrain and valleys floor.

Although the Mapunapuna district presents minimal extremes in topography, the computed solar map shows variations of solar radiation within the area, due to distant hills and mountain range. When compared to the solar map currently used in the industry, the new solar map derived from the Solar Analyst proves to be far more accurate and conductive to a better solar potential assessment. On the new digital solar maps, each 10 meters by 10 meters DEM cell can be queried for an insolation value.

The following table presents the annual average daily global insolation values on horizontal surface within the sectors analyzed in the Mapunapuna district:

TABLE 3.5

Annual Average Daily Global Insolation in the Mapunapuna District.

| Sector | Annual Average Daily Global Insolation (kWh/$m^2$)† |
|---|---|
| 1 | 5.34 |
| 2 | 5.31 |
| 3 | 5.34 |
| 4 | 5.34 |
| 5 | 5.34 |
| 6 | 5.28 |

†The values were query in the geographic center of the sector.

Assessment of Insolation on Existing Building Rooftops:

The following paragraphs describe the solar radiation modeling program as well as the various variables needed for the assessment of insolation on the existing building rooftops. See below for the final insolation results of the Mapunapuna solar assessment research.

Helianthus—Insolation Modeling Program:

Once the above parameters have been identified and collected, the research team input them into a solar radiation program that was especially developed for the project. The program was named Helianthus (Latin name for the Sunflower). It is, in its simplest form, a Microsoft Excel spreadsheet program in which formulae have been written to compute complex calculations of input variables.

The use of a spreadsheet software to perform the calculations needed for modeling insolation has two major benefits: flexibility in the choice of modeling formulae and interface with GIS software.

Modeling Formulae:

There exist many different formulae that will model solar radiations for different applications. While some might model insolation on an hourly basis, others are best at modeling monthly or annual averaged insolation. Since the output result can only be as accurate as the input variables, modeling hourly insolation will require hourly data inputs, which can be difficult to find for most localities. On the other hand, modeling monthly or yearly insolation will require data inputs that are more readily available for most regions.

The user-defined formula input of Helianthus allows the user to choose which modeling algorithm will be used to compute the input variables, based on the application and the availability of data.

Currently, three different algorithms have been written into Helianthus: the Liu and Jordan (1962) isotropic sky method as extended by Klein (1977), which models average radiation on sloped surfaces; the Klein and Theilacker (1981) method which also models average radiation on sloped surfaces of any azimuth; the Perez et al. (1988) model for hourly radiation on sloped surfaces, utilizing an anisotropic sky.

While the Perez model is accurate in modeling insolation, its requirement of hourly data inputs restricts its usage to these locations where such data are available and where the application would justify such level of accuracy. For the undertaken study, an averaged monthly or annual insolation modeling is deemed more appropriate, and the required data are available.

Furthermore, the averaging of data over many days, such as in monthly averages, has a dampening effect upon the difference in accuracy of different models. See, Muneer T., 1997, *Solar Radiation & Daylight Models for the Energy Efficient Design of Buildings*, Oxford, UK, Architectural Press. Consequently, while the Perez et al. model shows superior accuracy over the isotropic model for hourly irradiation modeling, both exhibit comparable results for monthly or annual average computation. Because the Liu and Jordan model performs poorly beyond an azimuth angle 15° from due South, the Klein and Theilacker model is currently used in Helianthus to compute monthly and yearly averaged insolation on tilted surfaces of any azimuth and slope angles. See, Duffie John A. et al., 1991, *Solar Engineering of Solar Processes*, New York, N.Y.: John Wiley & Sons. The complete formula of the model is presented in Appendix D. A discussion of the performance of Helianthus compared to other modeling program appears further in the report under "Accuracy Verifications". As more accurate or appropriate insolation models are being developed, their formulae can be written into Helianthus, thus increasing the algorithm library of the program.

Annual Average Insolation:

Because the models written into Helianthus are designed to generate insolation prediction for monthly average or shorter periods of time (i.e., daily, hourly), a formula was needed to allow the program to compute annual averages. The following method works satisfactorily to derive such value. It is based on the same methodology commonly used to derive monthly averages, i.e., using average days.

Here, instead of selecting the average day of the month (the average day of the month can be described as being the day of the month having its daily total insolation value closest to the mean daily total insolation value of that month.), Helianthus was programmed to compute the average day of the year. It does so by first calculating the daily extraterrestrial radiation on a horizontal surface for each day of the year, and averaging their sum. Next, the program finds the day of the year whose calculated daily extraterrestrial radiation value agrees best with the computed average. This specific day is termed the average day of the year. The annual average daily insolation is then estimated, using the same formulae used to generate monthly averages, but using the average day of the year instead of the usual average day of the month. A total annual average insolation is calculated by multiplying the annual average daily value by 365. While this method appears a bit crude and over simplistic, a subsequent section discussing the program's accuracy will show that it can yield reasonable results.

Data Inputs:

In order to compute insolation values, Helianthus, as with most modeling programs, will require a number of variable to be entered by the user. The minimum number of input is dictated by the type of algorithm used to compute the calculations. Hourly insolation modeling will require more variable inputs than a simpler modeling of monthly averaged insolation. The input fields can be divided into two categories: the geostatistical variables and the insolation variables. The geostatistical variables refer to the geographic location of the region under study, the time for which the user desires insolation outputs, and the specific configuration of the surface receiving the radiation. The insolation variables refer to the global insolation data required to perform the calculations. It can be hourly, daily, monthly, or annual insolation averages, depending on the application and selected algorithm. As seen earlier, these insolation data can be either collected from weather station databases, or derived with the Solar Analyst GIS software.

The following outlines the currently required variable data input in the Helianthus program:

Latitude—the latitude of the area under study. Required for solar geometry calculation.

Longitude—the longitude of the area under study. Required for the calculation of the solar time.

Standard Meridian of the Local Time Zone—required for the calculation of the solar time.

Month—the month for which the user desires insolation outputs. Required for solar geometry calculation. Not required for annual average calculation.

Day—the day, in Julian day format, for which the user desires insolation outputs. Required for solar geometry calculation. Note that for averaged monthly insolation modeling, the day entered should be the average day of the desired month, as defined in Appendix B.

Local Standard Time—the local time of the locality. Required for solar geometry calculation.

Time 1 and Time 2—two solar times, with Time 2 later than Time 1 (to create a time period). Required for the calculation of hourly insolation.

Tilt Angle—the slope angle of the surface receiving insolation [0-90]. Required for insolation calculation of a tilted surface.

Surface Azimuth Angle—the angle East [−] or West [+] of due South [0] of the surface receiving insolation. Due North=180. Required for insolation calculation of a tilted surface.

Surface Area—the area [$m^2$] of the surface receiving insolation. Required for the calculation of the total received insolation.

Albedo Factor—the reflectance of the ground surrounding the surface receiving the insolation. Required for insolation calculation of a tilted surface. A separate paragraph will discuss the effect of the Albedo factor on insolation calculation.

Surface Altitude—the elevation above sea level, in kilometer, of the surface or area under study. Required for the calculation of clear sky radiation components.

Daily Insolation on Horizontal Surface—the known daily insolation on a flat surface, in $Mj/m^2$, also known as peak sun hour ($kWh/m^2$). Required for the calculation of daily insolation on tilted surfaces, as well as hourly insolation on tilted surfaces, since the hourly insolation on horizontal surface can be derived from its daily counterpart. This number is not as readily available as monthly value. Accurate assessment of specific solar energy systems, however, can justify the use of such value. The Solar Analyst software can be used to identify this variable over large area.

Monthly Average Daily Insolation on Horizontal Surface—the known monthly average of daily insolation received on a flat surface, in Mj/m2. Required for the calculation of monthly average daily insolation on tilted surfaces. This number is easily obtainable through the NSRDB for specific cities within the United States. For other regions, the Solar Analyst can be used to identify this required input value.

Yearly Average Daily Insolation on Horizontal Surface— the computed average of the monthly average daily insolation on horizontal surface. Required for the calculation of yearly average daily and total insolation on tilted surfaces.

Data Outputs:

Once the required input fields are completed, Helianthus computes the variables through the different algorithms written into the program. The results appear on the same worksheet as the input data. Presently, these are the following outputs processed by the program:

Hourly Total Insolation on Tilted Surface (in $Mj/m^2$ and $kWh/m^2$).

Daily Total Solar Insolation on tilted Surface (in $Mj/m^2$ and $kWh/m^2$).

Monthly Average Hourly Insolation on Tilted Surface (in $Mj/m^2$ and $kWh/m^2$).

Monthly Average Daily Insolation on Tilted Surface (in $Mj/m^2$ and $kWh/m^2$).

Yearly Average Daily Insolation on tilted Surface (in $Mj/m^2$ and $kWh/m^2$).

Yearly Average Total Insolation on Tilted Surface (in $Mj/m^2$ and $kWh/m^2$).

Yearly Average total Insolation on Tilted Surface Area (in Mj and kWh).

Tables and Graphs:

Due to the flexibility of the Helianthus program, different tables and graphs can be computed to graphically display the calculated outputs. Some of the tables presently available present insolation values through a surface tilt angle versus azimuth angles matrix [Table 3.6] shown in FIG. 3.7. Other tables convert these insolation values into ratios, comparing the calculated insolation values to the maximum calculated insolation value, obtained at the optimum surface tilt and azimuth angle. These tables can be quite effective at presenting the level of performance achievable at a particular tilt and azimuth surface angle within a specific time frame [Table 3.7] shown in FIG. 3.8. Another table within the program identifies the optimum surface tilt and azimuth angle for the particular month or day as defined by the user. Finally, Helianthus assesses the insolation potential on a set of rooftop vocabulary through similar matrixes as the ones performing surface insolation analysis in relation to tilt and azimuth angles. A detailed study of these matrixes will be presented in a subsequent paragraph.

In addition to tables, a variety of graphs is generated from the program outputs. Most pertain to the relationship between surface tilt angle, orientation, and insolation.

Other Variables:

Four input variables will affect the overall radiation incident on a surface. The first two relate to the clearness index, or how much cloud cover should be considered and calculated into the computing model. In this study, the Solar Analyst software requires the input of such variables, specifically, the transmittivity of the atmosphere, as well as the diffuse proportion of the global normal insolation.

The third input variable relates to shading coefficient, or how much shading occurs on the surfaces under study. The shading might be produced by rooftop mechanical equipments, adjacent buildings, parapets, or others.

The last variable relates to ground reflection, also known as the Albedo factor, which can potentially increase the received insolation upon one surface.

The following sections will provide background information and tentative algorithms to identify an effective value for each of these four variables.

Cloud Cover:

Cloud cover refers to the amount of cloud present at a certain location. Because clouds and other atmospheric particles greatly affect the total radiation received on any terrestrial surfaces, modeling of clouds and atmospheric attenuations has received a lot of attention in the field of solar engineering. Many algorithms have been written over the years to account for this cloudiness factor, as T. Muneer described in *Solar Radiation & Daylight Models*. A commonly used cloudiness factor, known as clearness index, can easily be computed by dividing the received surface insolation by the extraterrestrial radiation. This ratio, in effect, represents the fraction of extraterrestrial solar radiation that makes it through the atmosphere. Of course, it requires the knowledge of both insolation values. While the extraterrestrial can easily be calculated, the terrestrial insolation is either a modeled or observed (or both) record, which availability has been previously discussed.

Other algorithms and models have been developed to identify the transmittivity of the atmosphere, more interestingly, derived from meteorological data such as atmospheric water vapor, airborne particulates, and the amount of mixed gases (oxygen, nitrogen, carbon dioxide, ozone . . . ). These different atmospheric transmittivity coefficients can be ultimately derived from simple meteorological data such as air temperature, atmospheric pressure, and relative humidity. One such model, the Meteorological Radiation Model (MRM), was indeed developed upon these data, and enables the estimation of horizontal beam and diffuse solar radiation for any location where such readily available meteorological data can be gathered. The precision of the MRM can be quite remarkable under clear sky conditions (cloudless), with accuracy approaching 4% error deviation with observed hourly radiation. Under overcast conditions, however, the model performs quite poorly, with error deviations reaching 30%.

The Solar Analyst software requires two variables that are dependant (inverse proportional) of one another. The first one, the sky transmittivity, is defined as "the proportion of exoatmospheric radiation transmitted as direct radiation along the shortest atmospheric path". See, Helios Environmental Modeling Institute, 2000, *The Solar Analyst* 1.0 *User Manual*, KS: HEMI. The software manual proposes typical values of 0.6 to 0.7 for very clear sky conditions and 0.5 for generally clear sky. The second value, the diffuse proportion, is defined as "the proportion of the global normal radiation flux that is diffuse". Here, the software manual proposes typical values of 0.2 for very clear sky conditions and 0.3 for generally clear sky.

While the proposed values for the required variables might provide adequate results, the research team desires somewhat more location-specific values to generate accurate insolation prediction. On-going research at the Environmental Research & Design Laboratory of the School of Architecture is attempting to identify, or rather model, these two critical variables through the utilization of simple meteorological data, such as the ones used in the MRM. If successful, the research team hopes to integrate the developed algorithms into the Helianthus program for the rapid calculation of the sky transmittivity and diffuse proportion according to user-defined meteorological data inputs.

Shading Coefficient:

The shading of surfaces (especially located on rooftops) by diverse features such as elevator towers, roof parapets, architectural elements, or adjacent, obstructive structures can significantly decrease the total amount of received insolation. The current study has made a few rough calculations for surface-shading factors apart from topographic overshadowing. Shading created by man-made structures (or vegetation) has not yet been modeled into such GIS program as the Solar Analyst. It is not to say that it would be impossible. In fact, one can imagine creating a DEM based on an urban environment rather than topography, or, better a combination of both. While not available to the research team at the time of this writing, future work would certainly focus on developing such DEM.

In the meantime, shading coefficients could be evaluated with the aid of aerial photographs and GIS programs. The proposed concept to identify a shading coefficient specific to an area is as follows. Most modern aerial photographs have a record of the altitude, location, date and time at which the picture was taken. Often, these will appear printed within the borders of the actual photograph. The date and time components are very important to this study, because they will allow the simple calculation of solar geometry, i.e., the position of the sun at the time the photograph was made. By identifying and summing up shadowed surface areas on the aerial photograph through a GIS-based program (more on the topic of image recognition in the following chapter), one could create a shading ratio by dividing the shadow area by the total area encompassed by the photograph. This shading ratio, particular to a date and time, could be integrated over a user-defined period (daily, monthly or yearly) through an algorithm to obtain an average shading coefficient specific to the area defined by the photograph. This method of identifying a shading coefficient for a particular area is still in a conceptual phase. No algorithm capable of such a task has yet been developed, but the research team intents to undertake this research to increase the reliability of future outcomes.

Overshadowing rooftop features have a minimal impact upon total incident insolation. The identified buildings within the Mapunapuna district (industrial and residential) have little mechanical systems on their roofs. Larger buildings, such as hotels in Waikiki and high-rise apartment buildings seem to have the highest number and volume of rooftop structures. Until the development of a systematic shading coefficient identification method, the research team assigned the following shading factors to the various building types comprised in different land use and zoning divisions:

TABLE 3.8

Shading Coefficients Assigned to Building Types.

| Building Type | Shading Factor† |
| --- | --- |
| Residential Homes <4 story | 5% to 10% |
| Industrial Structures | 10% to 15% |
| Residential High-Rises >4 Story | 15% to 30% |
| Office High-Rise >4 Story | |
| Hotels High-Rise >4 Story | |

†Percent of total rooftop area in shade.

Albedo Factor:

Albedo (Latin for whiteness), or ground reflectance, is an important factor to take into consideration for the modeling of any representative surface insolation. As direct solar radiation reaches the surface of the Earth, a fraction is reflected back into space. On average, 5% (Albedo factor=0.05) of the total incoming extraterrestrial solar radiation is reflected by the Earth surface. This low Albedo is due to the low reflectivity of the ocean covering most of the globe. At a smaller scale, a higher percentage of the incoming radiation will be reflected from the ground, depending on the type of material it is constituted. This reflected solar radiation can be intercepted by steep-slope surfaces, thus increasing their overall insolation. Because the model used in Helianthus takes in consideration this ground-reflectance value, an appropriate identification of the Albedo factor is essential. The following section will present various Albedo values deemed adequate for their associated ground material. Their selection will depend on the type of material that surrounds the surfaces under study. These values can be entered directly into the Albedo Factor input field of the Helianthus program.

Albedo Values:

The following tables describe the Albedo values for a wide variety of ground surfaces. The tables are directly borrowed from the *Solar Radiation & Daylight Models* book by T. Muneer (1997). Note that when entering these values into the Helianthus program, a decimal number must be used (0.20, not 20%).

TABLE 3.9

Albedo of soil covers.

| Soil | Albedo (%) |
| --- | --- |
| Black earth, dry | 14 |
| Black earth, moist | 8 |
| Grey earth, dry | 25-30 |
| Grey earth, moist | 10-12 |
| Ploughed field, moist | 14 |
| White sand | 34-40 |
| River sand | 43 |
| Light clay earth (leveled). | 30-31 |

TABLE 3.10

Albedo of natural surfaces.

| Surface | Albedo (%) |
| --- | --- |
| Fresh snow cover | 75-95 |
| Old snow cover | 40-70 |
| Rock | 12-15 |
| High density grass | 18-20 |
| Densely built-up areas | 15-25 |
| Sea ice | 36-50 |
| Water surfaces, sea | 3-10 |
| Lawn: high sun, clear sky | 23 |
| Lawn: high sun, partly cloudy | 23 |
| Lawn: low sun, clear sky | 25 |
| Lawn: high sun, overcast day | 23 |
| Dead leaves | 30 |

TABLE 3.11

Albedo of vegetative covers.

| Class of vegetation | Species at maximum ground cover | Albedo (%) |
| --- | --- | --- |
| Farm crops | Grass | 24 |
| | Wheat | 26 |
| | Tomato | 23 |
| | Pasture | 25 |
| Natural vegetation and forest | Heather | 14 |
| | Bracken | 24 |
| | Deciduous woodland | 18 |
| | Coniferous woodland | 16 |

TABLE 3.12

Albedo of building materials.

| Surface | Albedo (%) |
|---|---|
| Weathered concrete | 22 |
| Weathered blacktop | 10 |
| Bituminous and gravel roof | 13 |
| Crushed rock surface | 20 |
| Building surfaces, dark (red brick, dark paints, etc.) | 27 |
| Building surfaces, light (light brick, light paints, etc.) | 60 |

Effect of Albedo on Surface Insolation:

To demonstrate the effect of the Albedo factor upon total surface insolation, a comparison analysis was done between insolation values generated within similar parameters apart from the Albedo coefficient. The analysis followed these general procedures:

Surface tilt angles ranging from 0° (flat) to 90° (vertical) at 5° increments were selected for the computation.

The values were calculated for azimuth angles ranging from 0° (south) to 180° (north) at 22.50 increments.

A latitude angle of 21.330 and longitude angle of 157.92° were chosen for the calculations; these coordinates correspond to the geographical position of the weather station WBAN N° 22521 based in Honolulu, Hi.

The values were calculated through the Helianthus program for a yearly average total insolation, in kWh/m$^2$.

All values were computed with an Albedo factor of 0% (no ground reflectance), 10%, 20%, 30% and 40%.

Each value computed at similar tilt and azimuth angles with an Albedo of 10%, 20%, 30% and 40% was then compared to the value calculated at similar tilt and azimuth angles with a 0% Albedo factor. The comparison was calculated as follow: % Error=$(R_x-R_0)/R_0$, where $R_x$ is the insolation value computed with an Albedo factor of x %, and $R_0$ is the insolation value computed with an Albedo factor of 0%.

The result of the analysis reveals that the error deviations computed for the insolation values calculated with an Albedo factor of 20%, 30% and 40% are the product of the error deviations computed for the insolation values calculated with an Albedo factor of 10% and their respective Albedo factor divided by 10%. In other words, the error deviation computed for the insolation values calculated with an Albedo factor of 20% are twice those calculated with an Albedo factor of 10%. Thus, presenting the error deviation computed for the insolation values calculated with an Albedo of 10% is enough to estimate the error deviation computed with other Albedo factors. See Table 3.13 shown in FIG. 3.9 for the computed error deviation values between insolation calculated with an Albedo of 0% and insolation values calculated with an Albedo of 10%.

Table 3.13 clearly shows an increase in insolation as the surface tilt becomes steeper and the azimuth approaches due north. This is consistent with the Klein & Theilacker model written into Helianthus, where the isotropic diffuse and ground-reflected insolation components are modeled by factoring a view factor of the sky and a view factor of the ground. This view factor is an index defining how much of the surface is seeing the sky (when diffuse insolation is calculated) or the ground (when ground-reflected insolation is calculated). The mathematical form of these two indexes clearly appears in the general formula presented in Appendix D. Part of the ground-reflected radiation bounces back to the sky where it gets further scattered by cloud cover and becomes part of the total diffuse insolation. Thus, as the Albedo increases, the total diffuse insolation increases as well. Since the north-facing surfaces receive most of their insolation from diffuse radiation (in the northern hemisphere), an increase in the Albedo factor will increase total insolation the most on surfaces facing north (up to 21% for each 10% Albedo increase in the comparison analysis). Furthermore, as the surface tilt angle becomes steeper, it is able to see more of the ground-reflected radiation, thus also increasing the total insolation value (by up to 10% per 10% increase in Albedo in the comparison analysis).

As the analysis describes above, the ground Albedo surrounding the surfaces under study can dramatically increase the total received insolation and should be carefully identify for representative insolation assessment.

The Albedo factor selected for the Mapunapuna district is 20%, representing an average value for a high-density build-up area.

Rooftop Vocabulary:

The establishment of a rooftop vocabulary is essential to the insolation assessment. As it was shown previously, tilt and azimuth angles will dictate the amount of insolation obtainable on a specific surface, at a particular location. Because the project research focuses on an insolation assessment of building rooftops, an exploration of roof typology seems imperative. A rooftop vocabulary helps in rapidly identifying the potential insolation incident upon an entire roof typology, be it shed, hip or gable.

Identification of a Workable Rooftop Vocabulary:

The vast diversity of existing roof configurations within a given region renders the identification of individual rooftop physical properties, such as tilt and orientation, extremely difficult. FIG. 3.3 presents a sample of architectural roof typology. See, Hepler D. E. et al., 1990, *Architecture: Drafting and Design*, New York, N.Y., McGraw-Hill Company. Instead, a systematic rooftop vocabulary based on a primary roof element was developed to simplify the process [FIG. 3.4]. Based on the symmetrical deconstruction of a square symbolizing a roof, the research team will show that many common roof forms can be reconstructed from the proposed vocabulary, providing a workable and appropriate medium to assess incident solar radiation. The following assumptions were made while developing the rooftop vocabulary:

The primary roof elements comprising an association are equal in slope and surface area.

Each configuration and association (single, pairs or triplets) of the primary roof elements is represented for azimuth angle ranging from 0° to 360°, at 22.5° interval. This broadens the vocabulary to 16 different configurations per primary roof element association. Certain associations require a shorter range of orientation configuration due to the geometric redundancy imposed by their symmetry (opposing pairs, quadruplet).

For each configuration, the association receiving solar radiations is represented by blank surfaces; hatched surfaces represent non-receiving areas.

Each association (single, pairs, triplets and quadruplets) is assigned equal surface area. Slopes can vary from one association to the next. This facilitates the comparison between different roof typologies.

Reconstruction of Roof Typology:

Each association within the rooftop vocabulary must be seen as a building block to recreate a variety of common roof types. Once confident in their reconstruction process, one must recognize the roof typology typical to the area under study. This involves identifying the typical typology, tilt and azimuth angles of building rooftops. Because such roof properties are difficult to identify from aerial photographs, visual surveys are the preferred way to assess rooftop properties. Areas of homogeneous rooftop typologies are often clearly defined by the zoning district in which they fall. Buildings located in an industrial zone will feature distinctive and different rooftops than buildings located in residential areas.

Roof Type:

The roof type of an area will determine which association will be combined from the rooftop vocabulary. Common roof types include shed roofs, flat roofs, gable roofs, hip roofs, and/or a combination of all four, with similar or different slopes.

Roof Orientation:

In the northern hemisphere, north-facing surfaces typically receive the least amount of solar radiation, since they are seldom exposed to direct sunlight. Exception occurs in areas located between the equator and the tropic of Cancer (23.45° N. latitude) where the sun is incident onto north-facing surfaces during the summer months. The island of Oahu, for example, receives direct solar radiation onto its north-facing surfaces between the 27$^{th}$ of May and the 16$^{th}$ of July every year. From mid-April to late August, the north façades are struck by low-angle sun from the east-northeast in the morning and the west-northwest in the late afternoons. During the rest of the year, north-facing surfaces receive predominantly indirect (diffused) solar insolation. The optimum tilt angle calculator integrated within the Helianthus program identifies that maximum insolation will be received on north-facing surfaces during the months of May, June and July when located in Honolulu, Hi.

Within certain parameters (roof types and slope angles), it can be shown that roof orientation will have only marginal effect on overall surface insolation.

Roof Slope:

The slope of a roof, also known as pitch, is of great importance for assessing the solar insolation striking its surface. Maximum solar insolation is achieved when the surface is normal, or perpendicular to the incoming sunrays. Because the path of the sun varies throughout the day and the year, the sunrays will be normal to surfaces having different slopes and orientations at different times of the year. In the northern hemisphere, the maximum annual solar insolation possible usually occurs on surfaces tilted at an angle equal to the site's latitude and facing due south. Thus, as Table 3.7 has shown us, the maximum annual solar insolation that can be received in Honolulu will occur on a surface facing south and tilted to a 20° angle, or more precisely, 21.3°.

In the construction industry, the slope of a roof is referred to as pitch, and is expressed as the ratio of rise over run, commonly on a base of 12 [see FIG. 3.5]. Thus, a 4/12 pitch is equal to a roof slope, or tilt angle of 18.43°, and a 12/12 is equal to a 45° slope. Table 3.14 shows the corresponding tilt angles for each respective roof pitch.

TABLE 3.14

Corresponding tilt angles for each respective roof pitch.

| Roof pitch | Tilt angle |
|---|---|
| 0/12 | 0.00 |
| 1/12 | 4.76 |
| 2/12 | 9.46 |
| 3/12 | 14.03 |
| 4/12 | 18.43 |
| 5/12 | 22.62 |
| 6/12 | 26.56 |
| 7/12 | 30.25 |
| 8/12 | 33.69 |
| 9/12 | 36.87 |
| 10/12 | 39.81 |
| 11/12 | 42.51 |
| 12/12 | 45.00 |

Effects of Roof Characteristics Upon Solar Insolation:

Within the parameters of roof types, orientation and tilt angles, the research identified the effects that each has upon the total annual solar insolation potential. The following tables [Table 3.15 shown in FIG. 3.10, Table 3.16 shown in FIG. 3.11, Table 3.17 shown in FIG. 3.12, Table 3.18 shown in FIG 3.13, and Table 3.19 shown in FIG. 3.14] are matrixes identifying the three parameters: roof type (in the form of primary roof elements) and orientation on top, and roof tilt angle on the left side. The calculations followed this procedure:

Insolation incident on each association was computed through the Helianthus program. Location was set to 21.33° North and 157.92° W. The Albedo factor was preset to 20%. Calculations were done for all associations, tilted at slope angles ranging from 0° (flat) to 90° (vertical), with a 5° interval.

A potential insolation ratio was assigned to all computed insolation values. This ratio is defined as the amount of incident radiation received compared to the maximum insolation value possible at the optimum surface tilt and azimuth angles of the location. Thus, a ratio of 80% signifies that the insolation received at that particular surface tilt and orientation equals 80% of the insolation incident on a surface sloped and oriented at optimum angles (where the potential insolation ratio equals 100%).

When an association is composed of more than one primary element, the ratio is calculated by adding the ratio of each primary element and dividing by the number of primary element making up the association. This method allows to compare different roof types (e.g., gable roof versus hip roof).

Because in the northern hemisphere the maximum annual insolation will be received on a south facing surface, it ensues that all roof associations get compared to a south-facing shed roof tilted at optimum slope angle and having a similar surface area.

From the presented tables, the following deductions can be made:

The orientation of gable roofs that are symmetrical in slope and orientation bears little influence (less than 1%) on the insolation potential between slope angles of 0° (flat) and 20°; insolation values vary by less than 2% on slope angles of 25° and 30°, and less than 5% on slope angles of 35° to 45°. The maximum difference in insolation potential is 9.66% (between south/north gable and east/west gable) occurring on roof slopes of 65° [see Table 3.18].

The orientation of hip roofs that are symmetrical in slope and orientation has practically no effect on their potential insolation. The maximum difference in insolation potential is 1.42%, occurring on symmetrical hip roofs with slope angle of 65° [see Table 3.19].

The difference of potential insolation is negligible between symmetrical hip roofs and symmetrical gable roofs of any orientation. A maximum difference of 6.25% in insolation potential occurs on roof sloped at 65°, between symmetrical hip roofs facing south-southwest/north-northeast and gable symmetrical gable roofs facing a south/north direction. Difference in insolation potential between these two roof types does not exceed 3% for slope angles ranging from 0° and 45° [see Table 3.18 & 3.19].

For the Phase I of the project, the following table presents the computed maximum total annual average insolation possible (at optimum slope and orientation) within the various sectors of the Mapunapuna district, the actual insolation potentials (as a ratio of the maximum) calculated from the identified rooftops, and their actual total annual average insolation values.

TABLE 3.20

Maximum (optimum) Total Annual Average Insolation and Actual Potential Insolation in the Mapunapuna District.

| Sector | Maximum Insolation Potential (kWh/m²) | Actual Insolation Potential Ratio | Actual Insolation Potential (kWh/m²) |
|---|---|---|---|
| 1 | 2029 | 94.80% | 1923 |
| 2 | 2016 | 91.3%-95.0% | 1841-1915 |
| 3 | 2029 | 91.3%-92.1% | 1852-1869 |
| 4 | 2029 | 92.9%-93.3% | 1885-1893 |
| 5 | 2029 | 91.3%-92.1% | 1852-1869 |
| 6 | 2002 | 97.7%-99.5% | 1956-1992 |

Total Insolation Calculation Procedure:

This describes step-by-step a procedure to undertake to generate a yearly total insolation value incident on the existing building rooftops of a defined area. While the various components of the procedures can be performed in a different order, the content remains similar to the outlined preceding protocols. See FIG. 3.6 for a graphical summary of the process. The steps are as follow:

Identification of the location of the area of study
Identification of the geographic coordinates (longitude & latitude) of the area of study
Input of the geographic coordinates into Helianthus
Acquisition of meteorological data of the area of study
Computation of the sky transmittivity and diffuse proportion of global radiation
Input sky transmittivity and diffuse proportion of global insolation into Solar Analyst
Acquisition of Digital Elevation Model of the area of study
Computation of global insolation on horizontal surface through Solar Analysis (GIS)
Input of the global insolation on horizontal surface into Helianthus
Identification of the Albedo factor for the area of study
Input of the Albedo factor into Helianthus
Visual survey of the area of study
Identification of the typical roof slope of the area
Computation of the slope factor
Identification of the typical roof orientation of the area
Identification of the typical roof type of the area
Identification of surface association from the rooftop vocabulary in Helianthus
Roof surface deconstruction
Input of surface properties into Helianthus
Acquisition of aerial photographs of the area of study
Scaling and georeferencing of the aerial photograph
Computation of the shading coefficient
Input of the shading coefficient into Helianthus
Computation of the rooftop area through Image Analysis (GIS)
Rectification of the area with the slope factor
Input of the rooftop area into Helianthus
Computation of rooftop insolation through Helianthus As described above, the procedure can be broken down into three main parts:

identification of the area of study, research of required variables, and the computation of the insolation. The research part is of course the most extensive. The visual survey of the area and the image analysis of the aerial photograph make up most of the research.

Results of Process

The total annual average insolation value incident upon the identified rooftops of the different sectors of the Mapunapuna district is presented below. In addition to the insolation values, land use information is also presented in the results. The zoning, or land use information was obtained by querying the various sectors overlaid by a zoning GIS layer. FIG. 4.1 is a screenshot of the GIS platform, showing the various GIS layers (roads, parcels, insolation), DEM overlaid over an aerial photograph mosaic of the Mapunapuna area. The following table presents the total annual average insolation for each sector analyzed within the Mapunapuna district:

TABLE 4.1

Total Annual Average Insolation for each Sector Analyzed within the Mapunapuna District.

| Sectors | Total Annual Average Insolation (kWh)† |
|---|---|
| 1 | 48,713,436 |
| 2 | 435,761,018 to 480,473,270 |
| 3 | 25,854,354 to 26,190,670 |
| 4 | 25,104,882 to 25,211,428 |
| 5 | 57,870,814 to 58,402,026 |
| 6 | 9,383,949 to 9,556,659 |

†The insolation does not account overshadowing.

For potential photovoltaic power, we assume the solar system to be 10% efficient and distributed to a nearby location to reduce power losses. The following table presents the total annual average insolation for each sector analyzed within the Mapunapuna district:

TABLE 4.2

Total Annual Average Photovoltaic Output for each Sector Analyzed within the Mapunapuna District.

| Sectors | Total Annual Average Photovoltaic Output (kWh)† |
|---|---|
| 1 | 4,871,343 |
| 2 | 43,576,101 to 48,047,327 |
| 3 | 2,585,435 to 2,619,067 |
| 4 | 2,5,10488 to 2,521,142 |

TABLE 4.2-continued

Total Annual Average Photovoltaic Output for each Sector Analyzed within the Mapunapuna District.

| Sectors | Total Annual Average Photovoltaic Output (kWh)† |
|---|---|
| 5 | 5,787,081 to 5,840,202 |
| 6 | 938,394 to 955,665 |

†The insolation does not account overshadowing.

The following table presents the zoning nomenclature for each sector of the Mapunapuna district:

TABLE 4.3 zoning nomenclature for each sector of the Mapunapuna district.

| Sectors | Zoning Nomenclature | Code | Typical Building Type |
|---|---|---|---|
| 1 | Military and Federal Preservation | F-1 | Low-rise Residence |
| 2 | Intensive Industrial | I-2 | Industrial Buildings |
| 3 | Military and Federal Preservation | F-1 | Warehouse |
| 4 | Military and Federal Preservation | F-1 | Low-rise Residential |
| 5 | Military and Federal Preservation | F-1 | Low-rise Residential |
| 6 | Residential | R-5 | School |

Accuracy Verification

A series of testing and analysis were performed in order to assess the accuracy of the research's methods and procedures. The first verification deals with the accuracy of the Image Analysis GIS extension at identifying and sizing building rooftops from different scales of aerial photographs. The second verification is a detailed analysis of the accuracy of the solar radiation modeling program Helianthus.

Image Analysis Accuracy:

To determine the accuracy of the Image Analysis program, a comparison analysis was done. The following sections outline the procedure and results of the analysis.

The analysis was performed using two non-orthorectified aerial photographs, one scaled at 1:3600, and the other at 1:48000. Both were scaled to a known actual dimension that was recorded during a field measurement survey. A building was chosen and identified on the two photographs. For each picture, the building outline was traced within a CAD software [FIG. 5.1], and its rooftop surface area determined. The pictures were then run through the Image Analysis program and the rooftop of the building identified and sized [FIG. 5.2].

Table 5.1 presents the results of the above comparison analysis. It shows that the two different methods to identify building rooftop area generate very similar values, with a maximum error deviation of 2%. The reader should note that although the error deviation computed on the smaller scale photograph is smaller than the one calculated on the larger scale photograph, the latter most likely represent best the actual surface area of the building rooftop. Assuming that the traced photograph is a more accurate process to calculate the roof area of the existing buildings, the time spent in achieving such accuracy quickly offsets the benefits of the method, especially when compared to the small error deviation the Image Analysis generates.

TABLE 5.1

Comparison of CAD versus GIS Surface Area Recognition.

| Scale | AutoCAD | GIS | Error Deviation |
|---|---|---|---|
| 1:3600 | 30,511 ft² | 31,112 ft² | 2% |
| 1:48000 | 26,670 ft² | 27,044 ft² | 1.4% |

Helianthus Accuracy:

An assessment of the level of accuracy the Helianthus program is capable of achieving is of the utmost importance for the integrity and relevance of the overall research project. To evaluate that critical accuracy level, the program's outputs were compared against other software results, and against observed data recorded by a weather station in Honolulu that is used by NREL.

The following are the different software/models Helianthus was compared against:
- PV Design Pro from the Solar Design Studio V. 4.0, Maui Solar Energy Software Corporation, using the Perez et al model.
- PV Design Pro from the Solar Design Studio V. 4.0, Maui Solar Energy Software Corporation, using the HDKR model.
- ECOTECT v. 5.01 from Square One Research PTY LTD, using the Szokolay model.

The selection of these particular software was dictated by their overall reliable performance. PV Design Pro was developed with the help of the Sandia National Laboratory. ECOTECT is an environmental modeling software producing satisfactory results.

The following procedure was applied to compare the different insolation modeling software against Helianthus:
- An Albedo factor of 0.20 (20% ground reflection) was preset.
- Surface azimuth angles of 0° (south), ±45° (southeast & southwest), ±90° (east and west), ±135° (northeast and northwest), and 180° (north) were selected for the comparisons.
- Surface tilt angles of 0° (horizontal) to 90° (vertical), with 5° increments, were selected for the comparisons.
- The values were calculated for a yearly average total insolation, in kWh/m².
- A latitude angle of 21.33° and longitude angle of 157.92° were chosen for the calculations; these coordinates correspond to the geographical position of the weather station WBAN N° 22521 based in Honolulu, Hi. This weather station's insolation records are used by NREL as primary data for its national insolation database.
- For each set of computed data, the percentage deviation between the Helianthus program and other modeling software was computed as follow: % Error=$(P_h-P_o)/P_o$ where $P_h$ is the insolation value as computed by Helianthus, and $P_o$ is the insolation value as computed by the other program.

The following procedure was applied to compare the different insolation modeling software against observed insolation values:
- An Albedo factor of 0.20 (20% ground reflection) was preset.
- A latitude angle of 21.33° and longitude angle of 157.92° were chosen for the calculations; again, these coordinates correspond to the geographical position of the weather station WBAN N° 22521 based in Honolulu, Hi., from which the observed values were recorded.

Surface azimuth angle was set solely to 0° (south), as it is the surface orientation on which observed values were recorded.

Insolation values were computed on surface tilt angles of 0° (horizontal), 6.33° (latitude −15°), 21.33° (latitude), 36.33° (latitude +15°), and 90° (vertical).

The values were computed as monthly average daily insolation, expressed in kWh/m², for the 12 months of the year, as well as an annual average daily insolation compiling insolation values of all twelve months.

Each computed values was compared to the observed data, and attributed an error deviation calculated as follow: % Error=$(Y_c-Y_o)/Y_o$ where $Y_c$ is the insolation value as computed by the different software, and $Y_o$ is the insolation value as observed at the weather station.

Results of the accuracy comparisons between the Helianthus program and the other modeling software are best described when categorized by surface azimuth angles. Different insolation models will behave differently when presented with similar azimuth angles. For example, the isotropic models are infamous for generating overestimations of insolation values on north-facing and vertical surfaces, while very much in par with actual observed value on south-facing surfaces, for non-vertical tilt angles.

The results of the comparisons between Helianthus and other modeling software are as follow:

South-facing surfaces: Helianthus remains within a ±2% deviation from the Perez model (mostly lower values) for tilt angles up to 60°, then consistently generates higher values, up to +10.02% deviation on vertical tilt angle. Analogous results are observed when compared to the HDKR model, although Helianthus generates substantially lower values (down to −2.66% lower) on low surface tilt angles. When compared to Ecotect, Helianthus consistently computes higher values, from low to vertical tilt angles, up to a +13.68% deviation on a vertical surface. Across all tilt angles, Helianthus compares best with the Perez model, with an error deviation averaging +0.83%. Average deviations of +1.08% and +5.21% were produced when compared with the HDKR and Ecotect models respectively. See FIG. 5.3.

East/West-facing surfaces: error deviations generated by Helianthus when compared to the Perez model range from −3.10% at steep slope angles, down to −1.68% on flat surfaces. A comparable pattern is observed when compared to the HDKR model, but with lower error deviations, ranging from −2.66% on flat surfaces, down to −6.06% on vertical surfaces. Similarly to south-facing surfaces, Helianthus generates higher insolation values on east and west facing surfaces when compared to Ecotect, up to +9.67% error deviation on vertical surfaces. Once again, Helianthus compares best with the Perez model, with an error deviation averaging −2.54% across all surface tilt angles. Average error deviations of −3.77% and +4.95% were produced when compared with the HDKR and Ecotect models respectively. See FIG. 5.4.

North-facing surfaces: the error deviations derived from comparing the three different models to the Helianthus program seem to follow an identical pattern. The error deviations are fairly stable on low to medium tilt angles, staying on the lower end of the curves, until a sudden drop, with a maximum negative error deviation occurring on surface tilts of 65° for all three model comparisons. From there on, the error deviations increase consistently until they reach a maximum at surface tilt angle of 90°. The error deviations with the Perez model go as low as −10.91% on 65°, and as high as +19.21% on vertical surfaces. Error deviations of −9.17% and +18.34% are generated with the HDKR model for similar slope angles. Deviations with the Ecotect software fall to −17.95% at 65°, up to +5.51% on a 90° tilt angle. See FIG. 5.5.

After comparing Helianthus to different models, it seems only fair to assess the strengths and weaknesses of the programs when comparing them to actual data. It is unfortunate that the only reliable observed insolation values available to the research team were recorded on a south-facing surface only. The reader should bear in mind that a good match between modeled and observed values generated at one surface azimuth angle does not mean the model will necessarily agree with observed values recorded for different surface orientations.

The comparison analysis is presented in relationship to the five selected surface tilt angles [see also Table 5.2 shown in FIG. 5.2, Table 5.3 shown in FIG. 5.3, Table 5.4 shown in FIG. 5.4, and Table 5.5 shown in FIG. 5.5]:

Surface tilt of 0° (flat): on an horizontal surface, the Helianthus program performs very satisfactorily, generating error deviations with actual monthly average daily insolation values in the range of −0.15% in June, to −1.56% in May. An error deviation of −0.93% is achieved when comparing yearly average daily insolation, while the Perez, HDKR and Ecotect models produced deviations of +0.74%, +0.74% and −0.93% respectively. While Helianthus and Ecotect slightly underestimated their insolation values (they both generated similar insolation values), the Perez and HDKR model slightly overestimated theirs. See FIG. 5.6.

Surface tilt of 6.33°: on such low tilt angle, Helianthus seems to perform better than its competition. Error deviations range from −0.34% in April, to −3.26% in January. An error deviation of −0.36% is achieved when comparing yearly average daily insolation, while the Perez, HDKR and Ecotect models produced deviations of +1.64%, +1.09% and −0.91% respectively. See FIG. 5.7.

Surface tilt of 21.33°: on a tilt angle set to the latitude, Helianthus still performs adequately, although higher error deviations are generated. While the deviation in July was −0.17%, December was underestimated by −5.21%. In effect, an error deviation of −1.23% is achieved when comparing yearly average daily insolation, while the Perez, HDKR and Ecotect models produced deviations of +0.70%, −0.88% and −3.33% respectively. See FIG. 5.8.

Surface tilt of 36.33°: on steeper slope angles, the Helianthus program regains some reliability on an annual basis, even though deviations fluctuates between +0.39% in June, to −7.07% in February. An error deviation of +0.18% is achieved when comparing yearly average daily insolation, while the Perez, HDKR and Ecotect models produced deviations of +1.45%, −0.55% and −3.64% respectively. See FIG. 5.9.

Surface tilt of 90° (vertical): Helianthus performs quite poorly when estimating insolation on vertical tilt angle. While it overestimated September value by a marginal error deviation of +2.50%, it also overestimated the month of June by +27.14%, thus generating a poor error deviation of +12.41% on a yearly average daily insolation value. The Perez, HDKR, and Ecotect models, on the other hand, produced deviations of +2.07%, +4.14% and −1.38% respectively. See FIG. 5.10.

While it can be difficult to fully assess the performance of Helianthus on non-south-facing surfaces due to the lack of observed data, the following outlines key points from the comparison analysis against other models:

Helianthus overestimates annual average insolation incident on steep surfaces facing south (70° tilt angle and above) and north (75° tilt angle and above).

Helianthus underestimates annual average insolation incident on surfaces facing north and tilted at a slope angle between 55° and 70°. The research team believes that the maximum underestimation of annual average insolation occurs on a north-facing surface tilted to a slope angle equal to 90'-latitude.

Helianthus seems to perform adequately for simulating annual average insolation incident on east and west-facing surfaces, tilted to any angle.

Overall, the Helianthus program agrees best with the Perez et al model, generating an average error deviation of −1.27% across all considered tilt and azimuth angles for annual average insolation. Average error deviations of −1.70% and +1.69% were generated with the HDKR and Ecotect model respectively.

When compared to actual insolation incident on south-facing surfaces, the following observations were deduced:

The Helianthus program is deemed very reliable to estimate annual average daily insolation on south-facing surfaces tilted at slope angles of 0°, latitude −15°, latitude, and latitude +15°. Helianthus slightly underestimates the insolation values (−0.58%), while the Perez and the HDKR models tend to slightly overestimate them (+1.13% and +0.10% respectively). Ecotect consistently underestimated the insolation (−2.20%), but remained within a ±4% error deviation margin.

Helianthus seems to underestimates annual average daily insolation during low sun-angle months (winter), across all tilt angles (more so as the tilt increases). On the other hand, it bluntly overestimates annual average insolation values during the summer months on steep slope angles facing south. This observation agrees with the preceding comparison analysis.

See FIG. 5.11 for a graphic display of the comparison results pertaining to annual average insolation. It is clear, from the above accuracy assessment analysis, that while the Helianthus program can generate adequate annual average insolation estimations on all azimuth angles at low to medium slope angles, it cannot reliably estimate insolation values for steep tilt angles. Until better insolation modeling algorithms become available, one can remain confident of the suitability of the Helianthus program to derive credible results for the present research project. As pointed out in a preceding chapter, the typical roof slopes associated to general building construction rarely exceed the high tilt angle of 45° (a run over rise ratio of 12/12), thus reinforcing the confidence of the research team in the computed research results.

This study was able to compile a viable solar analysis method through the hybrid or synthesized utilization of a variety of disparate software applications. The methods and results obtained are believed to be the most advanced and accurate found anywhere in the world to date. Further refinements are required to take this analysis method into a more consolidated approach. This process, in this initial stage, but especially when further refinements are completed, represents a technology application that is transferable to any place in the world where the meteorological and Digital Elevation Model (DEM) data are available.

The most immediate application, as a result of this research, is to completely and accurately update the existing solar maps for any region. New solar radiation maps derived from this process would immeasurable improve the current understanding of insolation levels. Rather than the roughly concentric insolation gradient that ring the mountain ridges in the existing maps, the new maps would provide accurate insolation values on a 10 m by 10 m grid that responds specifically to all topography, mountain shading, clearness/shading values and surface reflectances.

The second application that would bring immediate benefits is standardizing a Solar Design Guideline. This would be a secondary product that links to and supports the new solar maps. The Solar Design Guideline is a result of the rooftop area, orientation and slope evaluation that was derived from this research. This rooftop analysis identifies the relative insolation values of various rooftop orientations at 360 degree compass rotations and at slopes from flat to perpendicular to the ground plane and all combinations in between. This Solar Design Guideline would provide accurate prescribed insolation values for new building design and existing solar potential evaluation on existing buildings within the various solar zones. These values will no longer need to be negotiated among developers, contractors, government, and utility representatives. The new solar maps and the design guidelines will be invaluable to all concerned parties as the state moves forward on its commitment to increase solar energy generation in the next 10-15 years.

The methodology calculates with acceptable accuracy the solar electric production potential of buildings located within industrial zones. Due to the nature of the land use, structures located in industrial zones typically have a high lot to buildable area square footage density. This high density combined with large, low-slopped, uninterrupted rooftop surface areas, creates a highly suitable medium for solar electric production, turning industrial zones into "micro power plants". Since the power generation infrastructure would not require any additional land area, this approach to electric generation would save valuable, arable lands while producing clean, renewable energy.

Certain improvements to the methods described herein can be foreseen for future use. New tools are being developed constantly. The next steps are to acquire new 3-D feature extraction software that will enable a three-dimensional extraction of features identified on aerial photographs, as well as the acquisition of urban environment DEMs that will work with Solar Analyst to evaluate insolation on all building surfaces while taking building overshadowing into consideration. Further work can be done to refine the rooftop shading values, to improve the shading data and to develop a working shading coefficient that can be effectively calculated for the various building types and incorporated into the Helianthus program.

It is understood that many modifications and variations may be devised given the above description of the principles of the invention. It is intended that all such modifications and variations be considered as within the spirit and scope of this invention, as defined in the following claims.

The invention claimed is:

1. A method for assessing solar insolation potential upon existing building rooftops in a given region comprising the steps of:
    (a) computing Global Horizontal Insolation values based on topographical Digital Elevation Model (DEM) data for the region;

(b) computing a Sky Transmissivity parameter as it affects Global Horizontal Insolation based on available climate and cloud cover data for the region;

(c) applying an Albedo parameter for ground reflectivity and scattering estimated for the region to determine Diffuse Insolation values;

(d) measuring shadow rooftop surface areas in relation to total rooftop area from aerial photographs of the region over defined times and periods of the year and determining a rooftop Shading Coefficient based thereon;

(e) determining Total Building Roof Area by measuring rooftop images from aerial photographs of the region;

(f) estimating a rooftop tilt angle for typical Roof Slope, Type, and Orientation (azimuth) selected from a defined set (vocabulary) of rooftop types based on a visual survey of the region;

(g) computing Total Building Rooftop Insolation Potential for the given region based upon said Global Horizontal Insolation values, Sky Transmissivity parameter, Diffuse Insolation values, rooftop Shading Coefficient, Total Building Roof Area, and typical Roof Slope, Type, and Orientation estimates; and (h) presenting a visual display of computed Total Building Rooftop Insolation Potential in relation to rooftop tilt angle for different times and periods of the year.

2. A method according to claim 1, wherein the computed Total Building Rooftop Insolation Potential is used to present a visual display of a Total Solar Energy Insolation Potential for the region.

3. A method according to claim 1, wherein the computed Total Building Rooftop Insolation Potential is used to present a visual display of a Total Photovoltaic Output Potential for the region.

* * * * *